United States Patent
Ibrahim et al.

(10) Patent No.: US 12,127,025 B2
(45) Date of Patent: Oct. 22, 2024

(54) METHOD AND APPARATUS FOR CLI REPORTING

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/315,222

(22) Filed: May 7, 2021

(65) Prior Publication Data

US 2022/0014954 A1    Jan. 13, 2022

Related U.S. Application Data

(60) Provisional application No. 63/050,719, filed on Jul. 10, 2020.

(51) Int. Cl.
*H04W 24/10* (2009.01)
*H04L 5/00* (2006.01)
(Continued)

(52) U.S. Cl.
CPC ........... *H04W 24/10* (2013.01); *H04L 5/0048* (2013.01); *H04L 5/14* (2013.01); *H04W 24/08* (2013.01); *H04W 72/21* (2023.01)

(58) Field of Classification Search
None
See application file for complete search history.

(56) References Cited

U.S. PATENT DOCUMENTS

| | | | |
|---|---|---|---|
| 2016/0065350 A1* | 3/2016 | Suzuki | H04L 5/0051 370/329 |
| 2016/0105248 A1* | 4/2016 | Lunttila | H04B 17/345 370/252 |

(Continued)

FOREIGN PATENT DOCUMENTS

| | | |
|---|---|---|
| CN | 108966348 A | 12/2018 |
| WO | 2019142524 A1 | 7/2019 |

(Continued)

OTHER PUBLICATIONS

3GPP, Technical Specification Group Radio Access Network; NR; Physical layer procedures for data (Release 16), Mar. 2020, TS 38.214, pp. 1-151.*

(Continued)

*Primary Examiner* — Adnan Baig
(74) *Attorney, Agent, or Firm* — Paul M. McAdams; Polsinelli LLP

(57) ABSTRACT

A base station may configure CSI-IM resources in a downlink BWP in a full-duplex slot. A UE may measure interference components in the CSI-IM resources and generate/transmit a CLI report comprising the measurement of the interference components to the base station. The measurement of interference components may include an RSSI measurement of intra-cell CLI from an interfering uplink signal transmitted from an aggressor UE or a self-interference from an uplink channel of the UE. The uplink signal may be an SRS, and the CLI report may include the RSSI, an RSRP, and/or an RSRQ of the interference in the CSI-IM resources in the uplink channel. The CSI-IM resources and the CLI report may have various configurations.

34 Claims, 21 Drawing Sheets

(51) Int. Cl.
    *H04L 5/14*         (2006.01)
    *H04W 24/08*      (2009.01)
    *H04W 72/21*      (2023.01)

(56) References Cited

U.S. PATENT DOCUMENTS

| | | | |
|---|---|---|---|
| 2018/0006794 A1* | 1/2018 | Lee | H04L 5/14 |
| 2019/0215130 A1 | 7/2019 | Aiba et al. | |
| 2020/0067614 A1* | 2/2020 | Wang | H04J 11/0056 |
| 2021/0058219 A1* | 2/2021 | Kimura | H04L 5/14 |
| 2021/0203464 A1* | 7/2021 | Ren | H04L 5/0007 |
| 2021/0243808 A1* | 8/2021 | Deenoo | H04B 17/309 |
| 2021/0250797 A1* | 8/2021 | Karjalainen | H04L 1/0026 |
| 2022/0030522 A1* | 1/2022 | Vejlgaard | H04W 52/245 |
| 2022/0140959 A1* | 5/2022 | Pedersen | H04W 72/541 370/329 |
| 2022/0191724 A1* | 6/2022 | Hwang | H04J 11/00 |

FOREIGN PATENT DOCUMENTS

| | | |
|---|---|---|
| WO | WO-2019246084 A1 | 12/2019 |
| WO | 2020125931 A1 | 6/2020 |

OTHER PUBLICATIONS

3GPP TS 38.214: "3rd Generation Partnership Project; Technical Specification Group Radio Access Network; NR; Physical Layer Procedures for Data (Release 16)", 3GPP Draft, DRAFT38214-G10, 3GPP TS 38.214, 3GPP, Mobile Competence Centre, vol. RAN WG1. No. V16.1.0, Apr. 1, 2020, pp. 1-151, XP051868248, Retrieved from Internet: URL: https://ftp.3gpp.org/tsg_ran/WG1_RL1/DRAFT/Draft_versions/Draft38214-g10.zip Draft38214-g10.docx [retrieved on Apr. 3, 2020], pp. 44-47, col. 5.1.6.5, Sections 5.2, 5.1.5, 5.2 to 5.2.1.6, 5.2.2.4, 5.2.5.
International Search Report and Written Opinion—PCT/US2021/031597—ISA/EPO—Sep. 16, 2021.

* cited by examiner

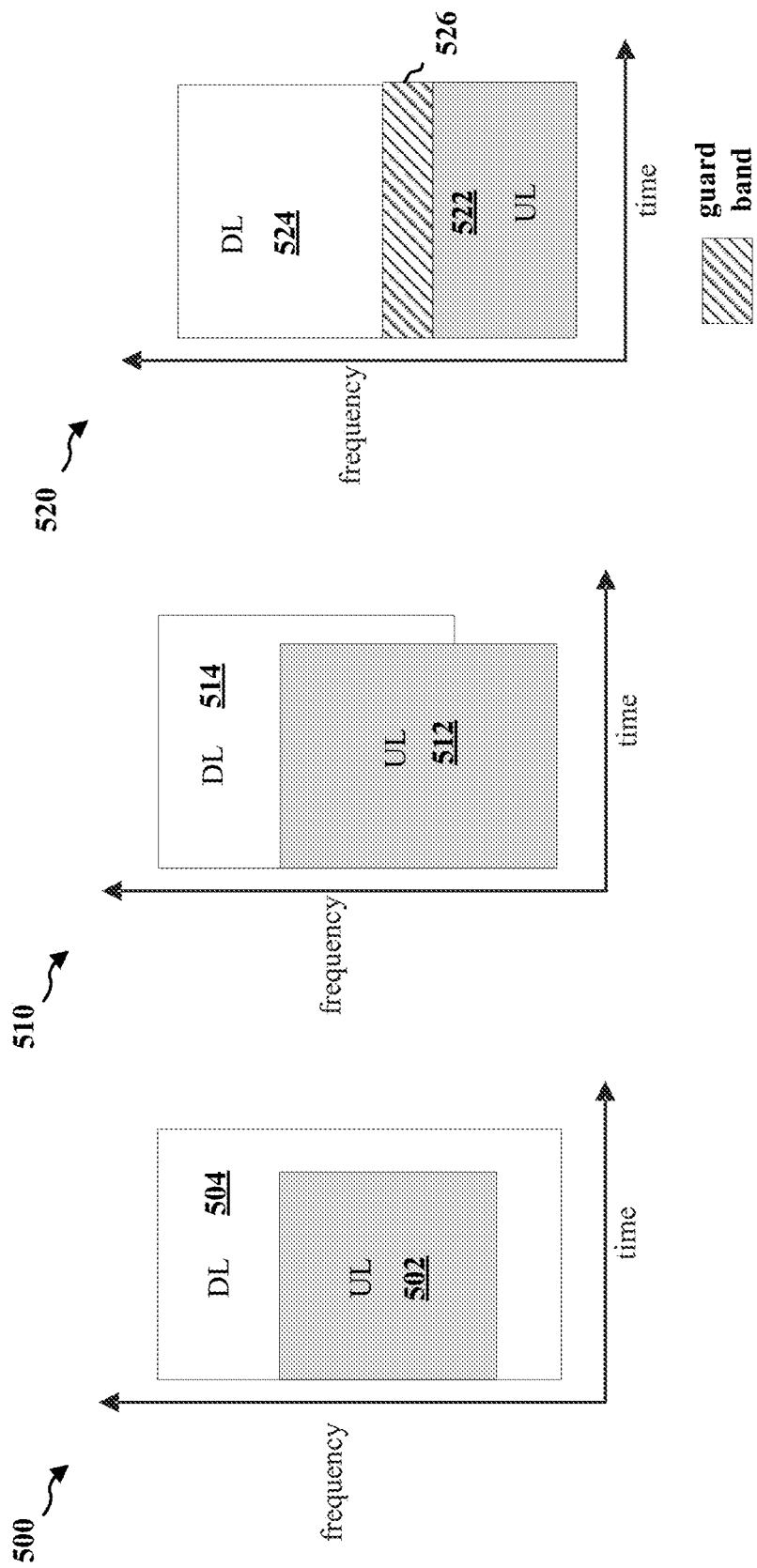

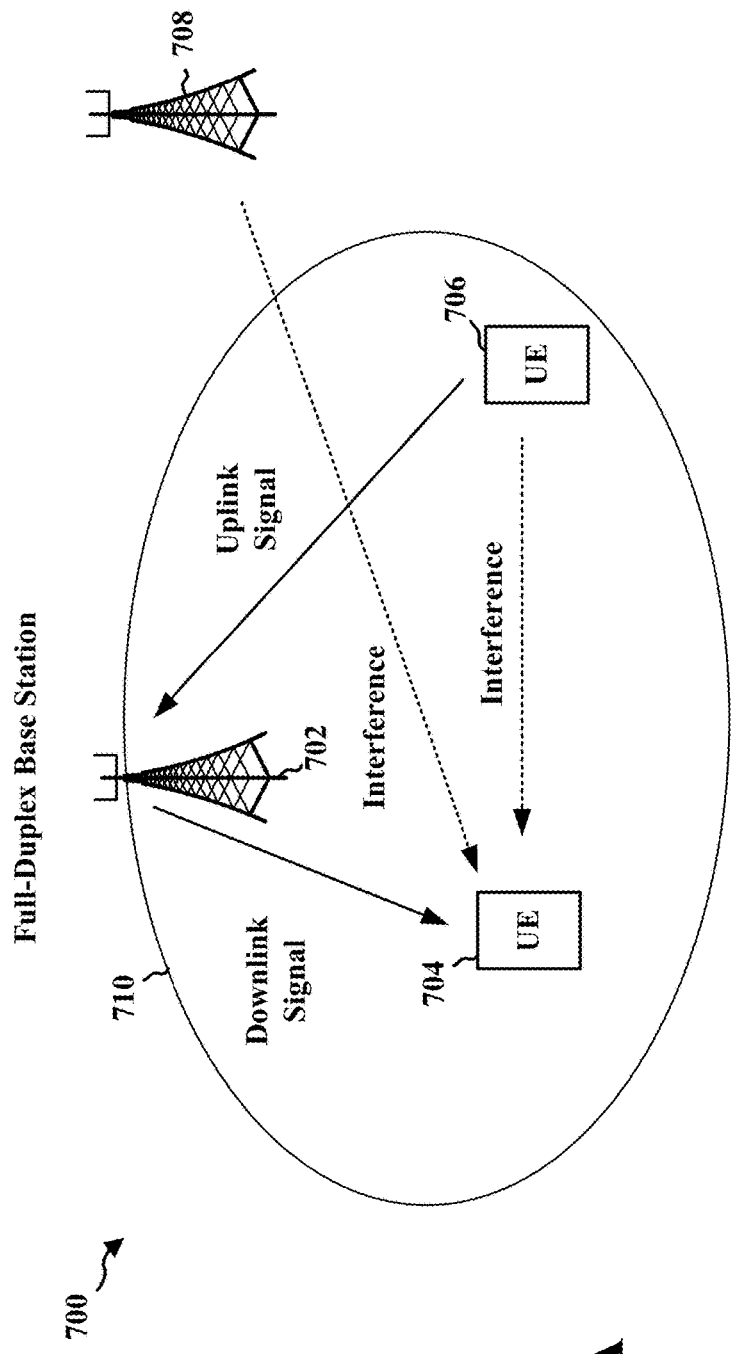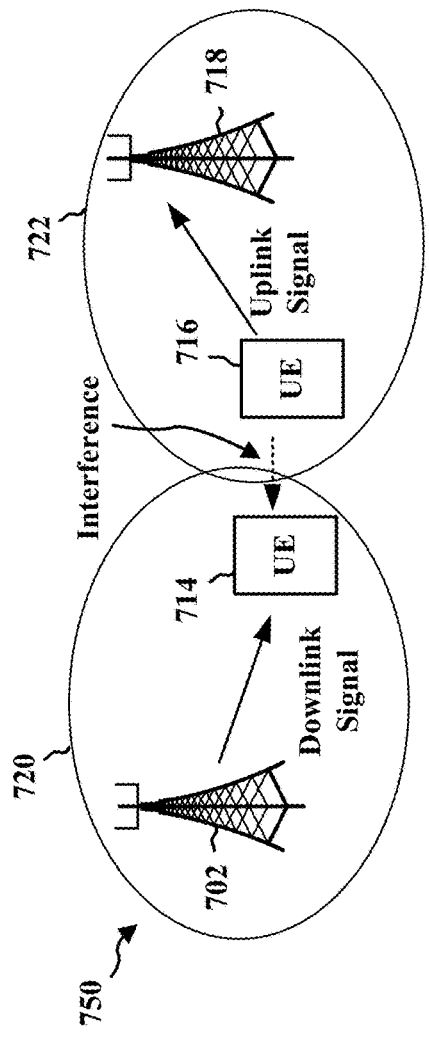
FIG. 7A
FIG. 7B

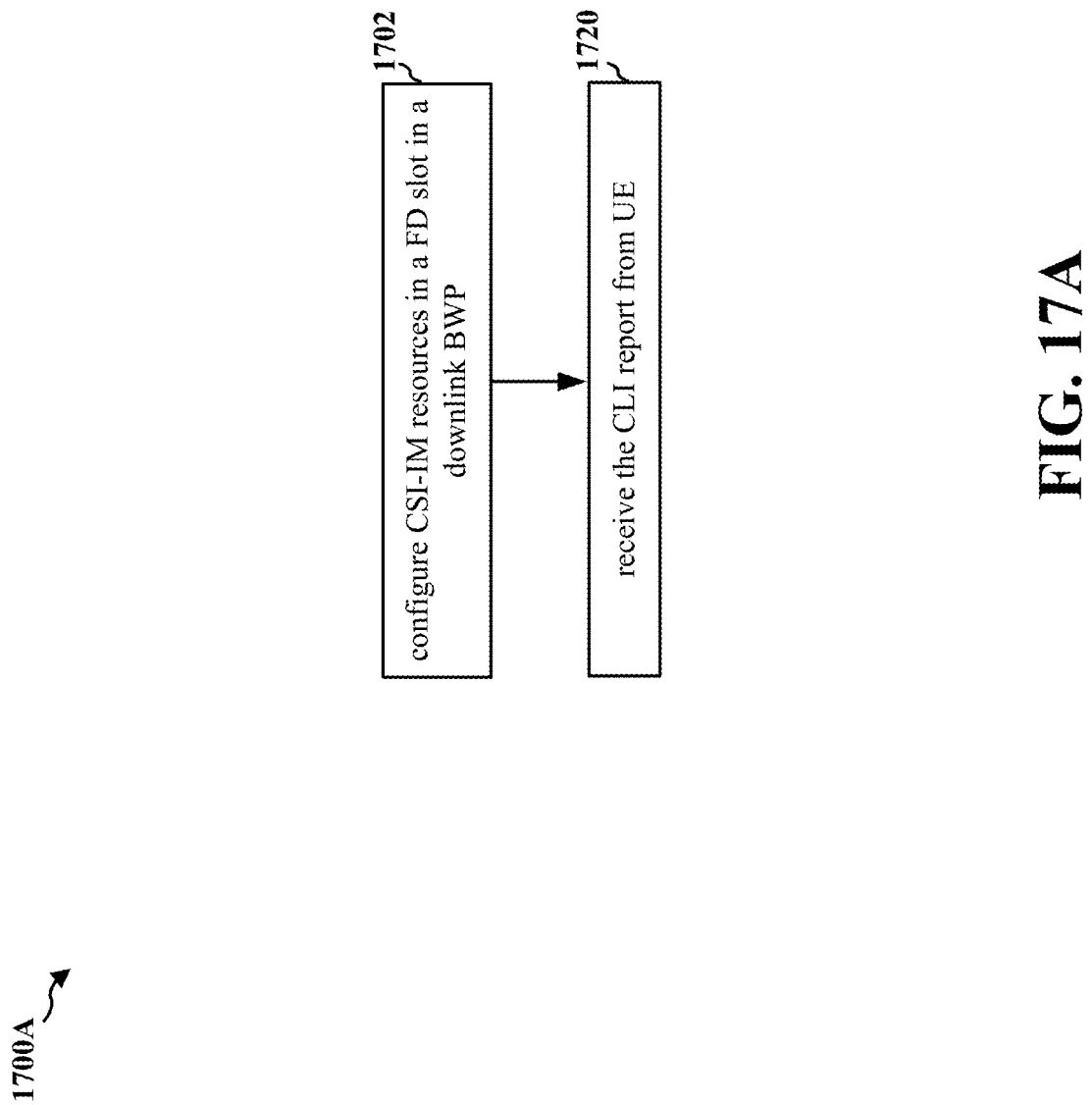

METHOD AND APPARATUS FOR CLI REPORTING

CROSS REFERENCE TO RELATED APPLICATION

This application claims the benefit of U.S. Provisional Application Ser. No. 63/050,719, entitled "METHOD AND APPARATUS FOR CLI REPORTING," and filed on Jul. 10, 2020, which is expressly incorporated by reference herein in its entirety.

TECHNICAL FIELD

The present disclosure relates generally to communication systems, and more particularly, to a method of wireless communication including intra-cell cross-link interference (CLI) reporting in a full-duplex (FD) communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine-type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method and apparatus of wireless communication may be configured to report intra-cell CLI and self-interference in a full-duplex communication. A base station may configure CSI-IM resources in a downlink bandwidth part (BWP) of a full-duplex slot. A UE may measure interference components in the channel state information (CSI) interference measure (IM) (CSI-IM) resources and generate/transmit a CLI report comprising the measurement of the interference components to the base station. The measurement of interference components may include a received signal strength indication (RSSI) measurement of intro-cell CLI from an interfering uplink signal transmitted from an aggressor UE or a self-interference from an uplink channel of the UE. The uplink signal may be a sounding reference signal (SRS), and the CLI report may include the RSSI, a reference signal received power (RSRP), and/or a reference signal received quality (RSRQ) of the interference in the CSI-IM resources in the uplink channel. The CSI-IM resources and the CLI report may have various configurations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A and 5B illustrate examples of resources that are in-band full-duplex (IBFD).

FIG. 5C illustrates an example of resources for sub-band full-duplex communication.

FIGS. 7A and 7B illustrate examples of intra-cell and inter-cell interference.

FIGS. 17A and 17B are flowcharts of a method of wireless communication.

DETAILED DESCRIPTION

Figure 1:
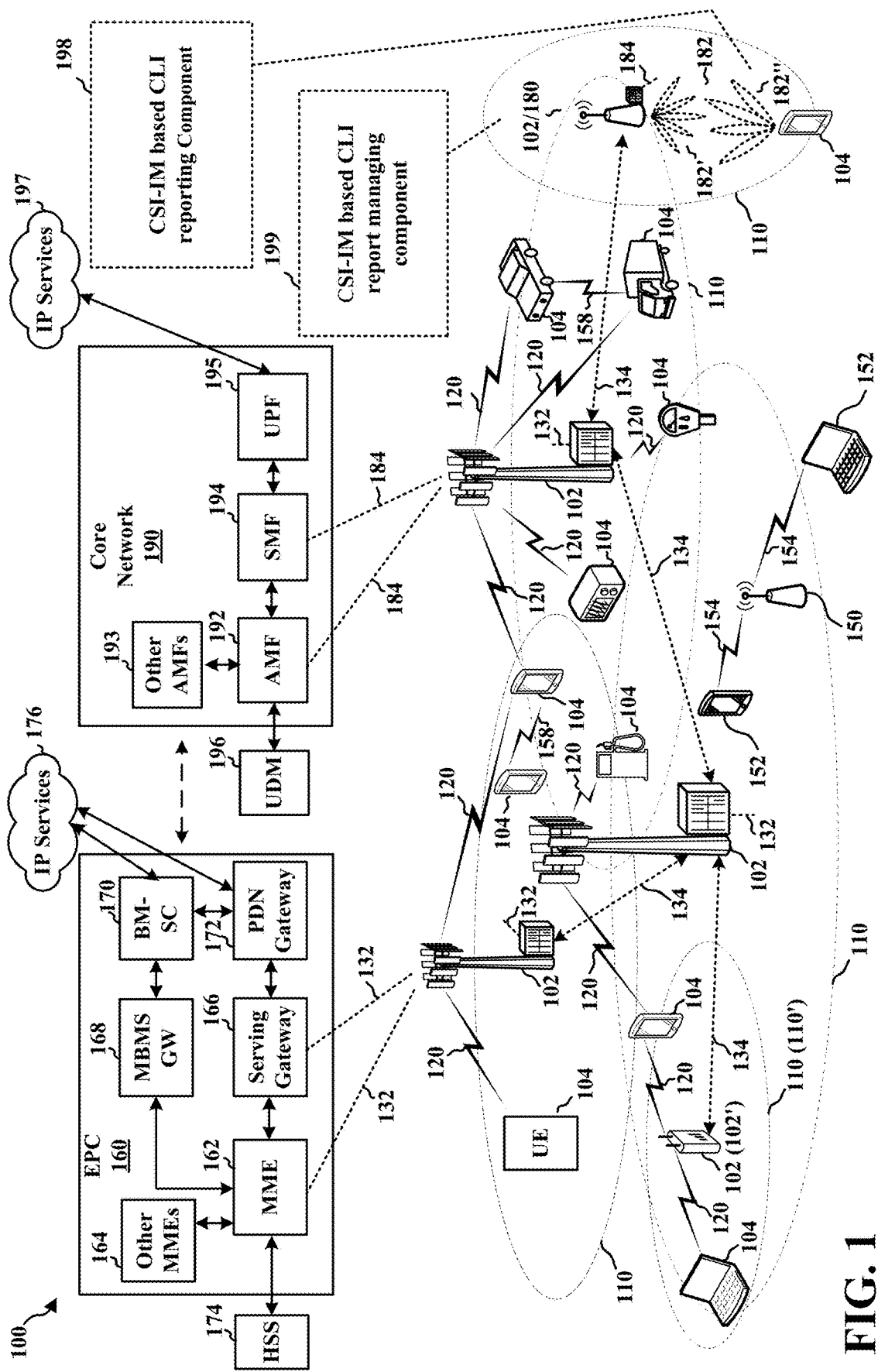
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node base station (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a CSI-IM based CLI reporting component 198 configured to receive, from a base station, a configuration for one or more CSI-IM resources in a BWP, measure at least one interference component of the CSI-IM resources in the downlink BWP, generate a CLI report including measurement of the at least one interference component, and transmit the CLI report to the base station. In certain aspects, the base station 180 may include a CSI-IM based CLI report managing component 199 configured to configure CSI-IM resources in a full-duplex slot in a downlink BWP and receive, from a first UE, a CLI report including at least one component of interference including a measurement of an interference in the CSI-IM resources based on an uplink signal transmitted to the base station. Although the following description may be focused on 5G NR, the concepts described herein may be applicable to other similar areas, such as LTE, LTE-A, CDMA, GSM, and other wireless technologies.

Figure 2:
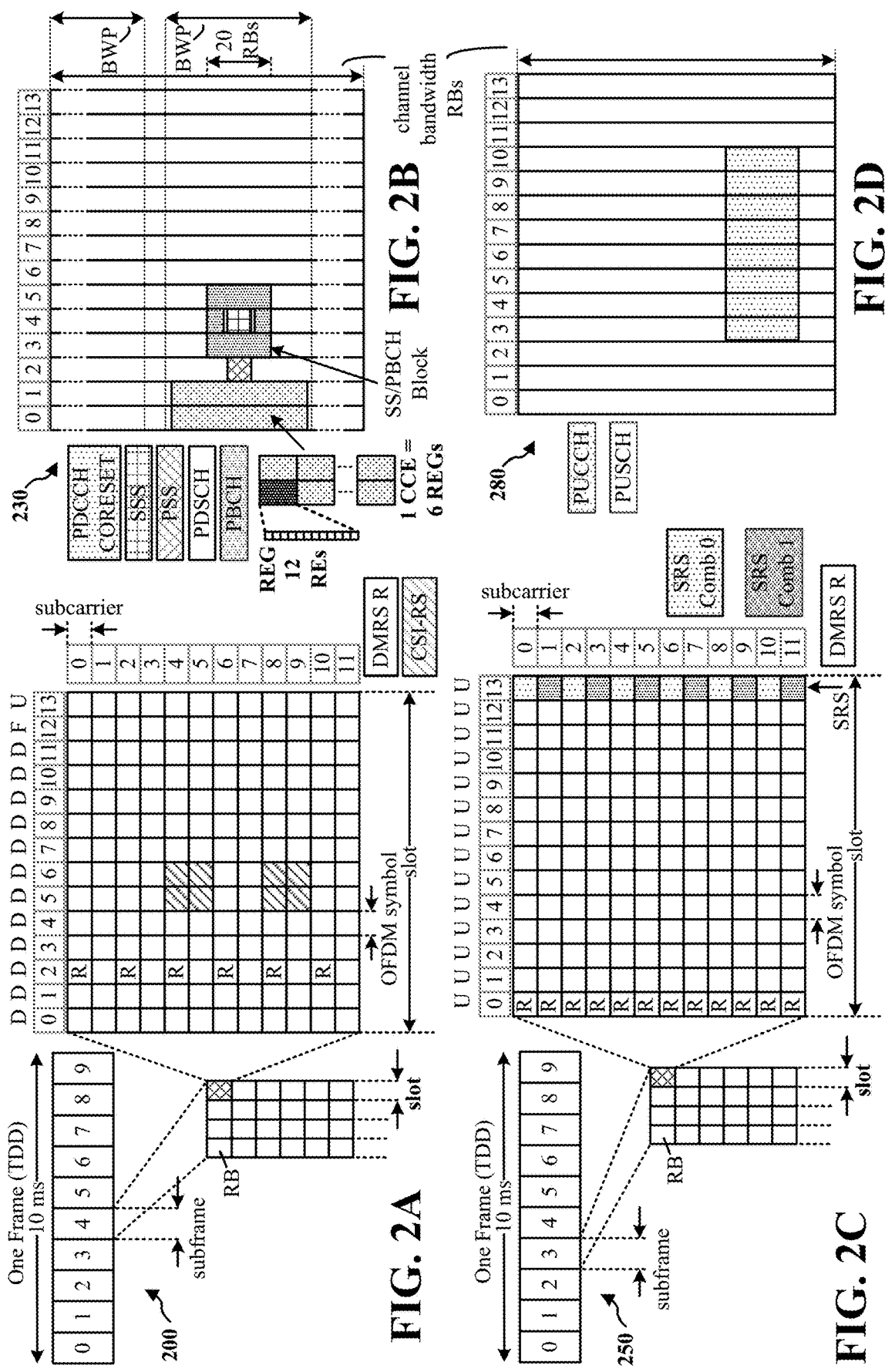
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
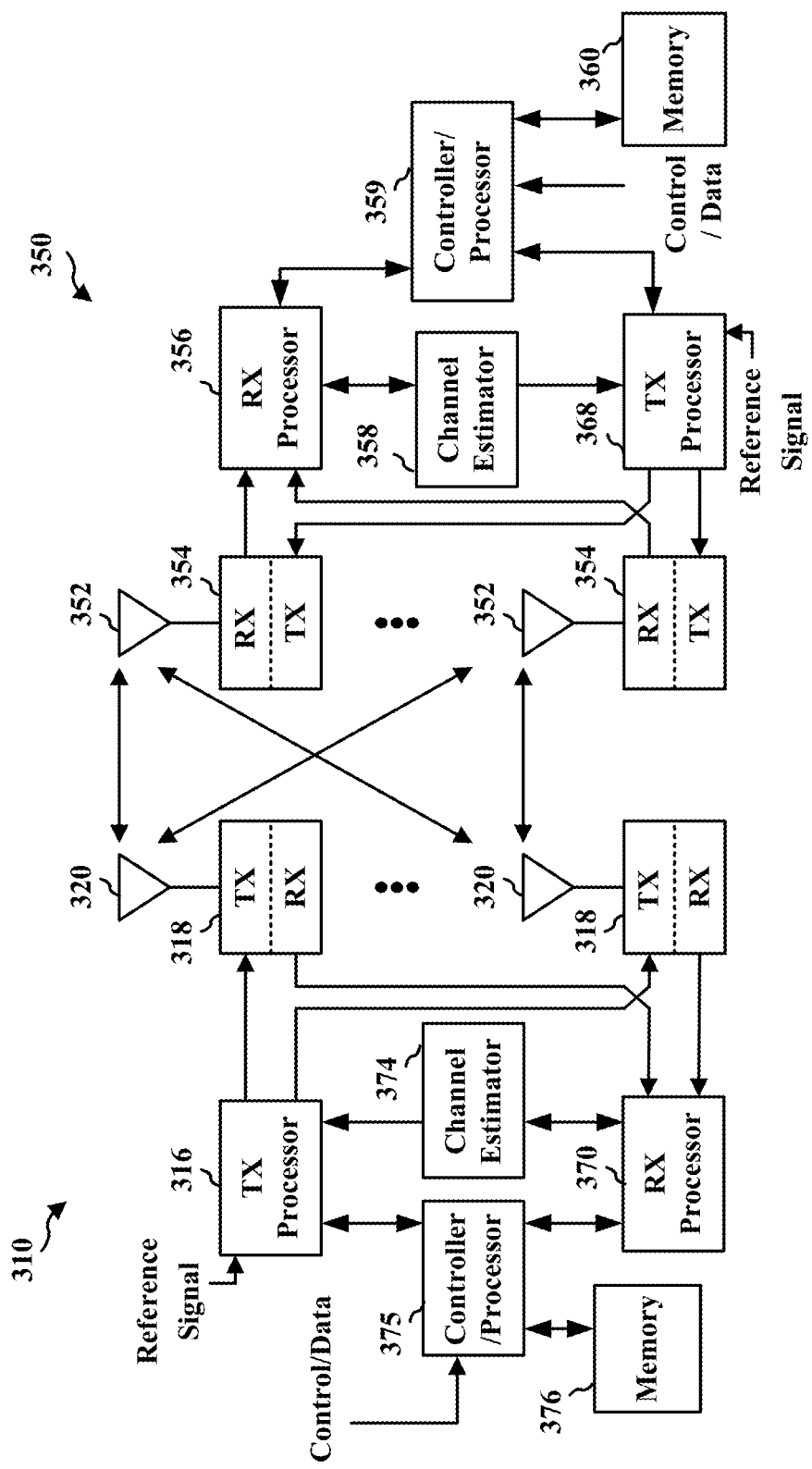
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4A:
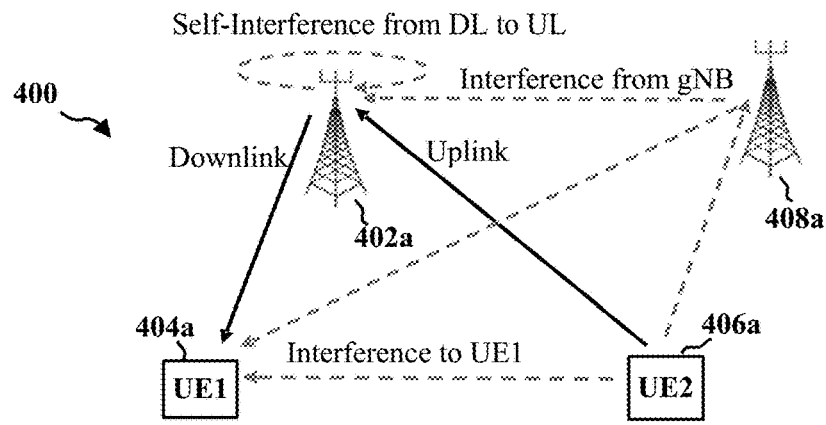
FIGS. 4A, 4B, and 4C illustrate exemplary modes of duplex communication.
Figure 4B:
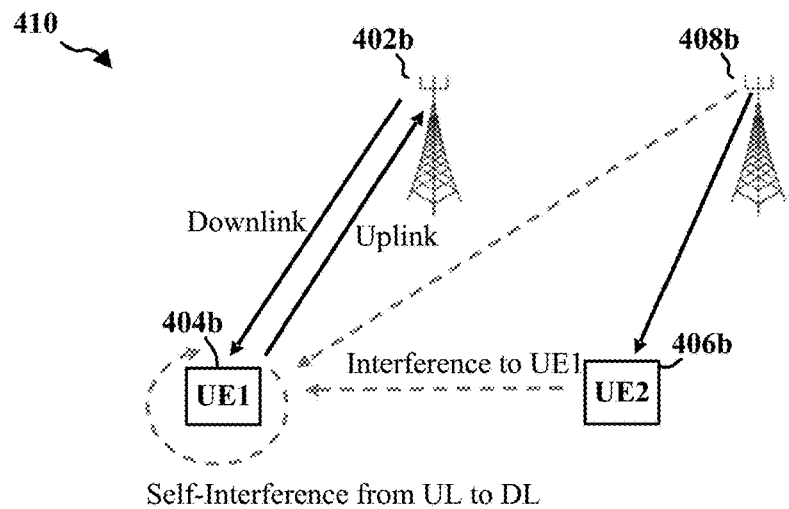
Figure 4C:
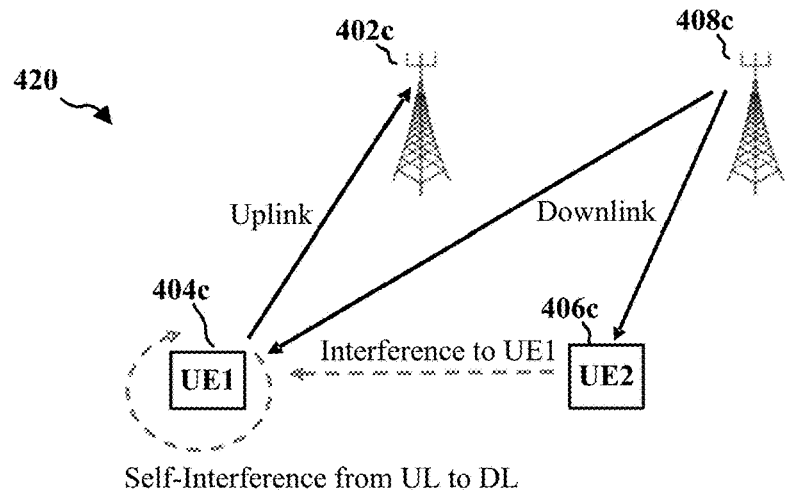

FIGS. 4A, 4B, and 4C illustrate various modes of duplex communication. A full-duplex communication may support transmission and reception of information (e.g., uplink and downlink communication) in the same frequency range (e.g., on one or more frequency bands) in a manner that overlaps in time. The frequency range may include a common set of frequency bands (e.g., the same frequency bands), fully overlapping frequency bands, or partially overlapping frequency bands. For example, in-band full-duplex (IBFD) operation may include the transmission and reception of signals at overlapping times and overlapping in frequency. In sub-band FDD, transmission and reception resources may overlap in time using different frequencies, e.g., separated by a guard band. The transmission and reception frequency resources may be close enough that interference cancellation methods are used to cancel interference from the transmitted signal. In this manner, the full-duplex communication may have an improved spectral efficiency than a half-duplex (HD) communication, which may support transmission or reception of information in one direction at a time without overlapping uplink and downlink communication. A UE or a base station operating in the full-duplex mode may simultaneously Tx/Rx full-duplex communication, and the UE or the base station may experience self-interference caused by signal leakage from its local transmitter to its local receiver. In addition, the UE or base station may also experience interference from other network devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a may be in full-duplex communication with a first UE 404a and a second UE 406a. The first base station 402a may be a full-duplex base station, and the first UE 404a and the second UE 406a may be configured as either a half-duplex UE or a full-duplex UE. The second UE 406a may transmit a first uplink signal to the first base station 402a as well as to other base stations, such as a second base station 408a in proximity to the second UE 406a. The first base station 402a may transmit a downlink signal to the first UE 404a concurrently with receiving the uplink signal from the second UE 406a. The first base station 402a may experience self-interference from the receiving antenna that may be receiving the uplink signal from the second UE 406a receiving some of the downlink signal being transmitted to the first UE 404a. The first base station 402a may experience additional interference due to signals from the second base station 408a. Interference may also occur at the first UE 404a based on signals from the second base station 408a and from uplink signals from the second UE 406a.

FIG. 4B shows a second example of full-duplex communication 410 in which a first base station 402b may be in full-duplex communication with a first UE 404b. In this example, the first base station 402b may be a full-duplex base station, and the first UE 404b may also be a full-duplex UE. That is, the first base station 402b and the first UE 404b may concurrently receive and transmit communication that overlaps in time in the same frequency band. The base station and the UE may each experience self-interference, in which a transmitted signal from the device may be leaked to a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c is a full-duplex UE in communication with a first base station 402c and a second base station 408c. The first base station 402c and the second base station 408c may serve as multiple transmission and reception points (multi-TRPs) for UL and DL communication with the first UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously. For example, the uplink signal may leak to the UE's receiver. That is, the uplink signal may be received by the UE's receiver. The first UE 404c may experience additional interference from the second UE 406c.

FIGS. 5A and 5B illustrate a first example 500 and a second example 510 of in-band full-duplex (IBFD) resources. FIG. 5C illustrates an example 520 of sub-band full-duplex resources. In IBFD, signals may be transmitted and received in overlapping times and overlapping in frequency. The first example 500 may illustrate that a time and a frequency allocation of a UL resources 502 may fully overlap with a time and a frequency allocation of DL resources 504. The second example 510 may illustrate that a time and a frequency allocation of UL resources 512 may partially overlap with a time and a frequency of allocation of DL resources 514.

The example 520 of FIG. 5C illustrates sub-band full-duplex (SBFD), where uplink and downlink resources may overlap in time using different frequencies. FIG. 5C illustrates that the UL resources 522 may be separated from the DL resources 524 by a guard band 526. The guard band may be frequency resources or a gap in frequency resources, provided between the UL resources 522 and the DL resources 524. The separation of the UL frequency resources and the DL frequency resources with a guard band may help to reduce self-interference. UL resources and DL resources that are immediately adjacent to each other may correspond to a guard band width of 0. An output signal from a UE transmitter, such as UL transmission, may extend outside the UL resources, and the guard band may reduce interference experienced by the UE. Sub-band full-duplex may also be referred to as "flexible duplex."

Figure 6:
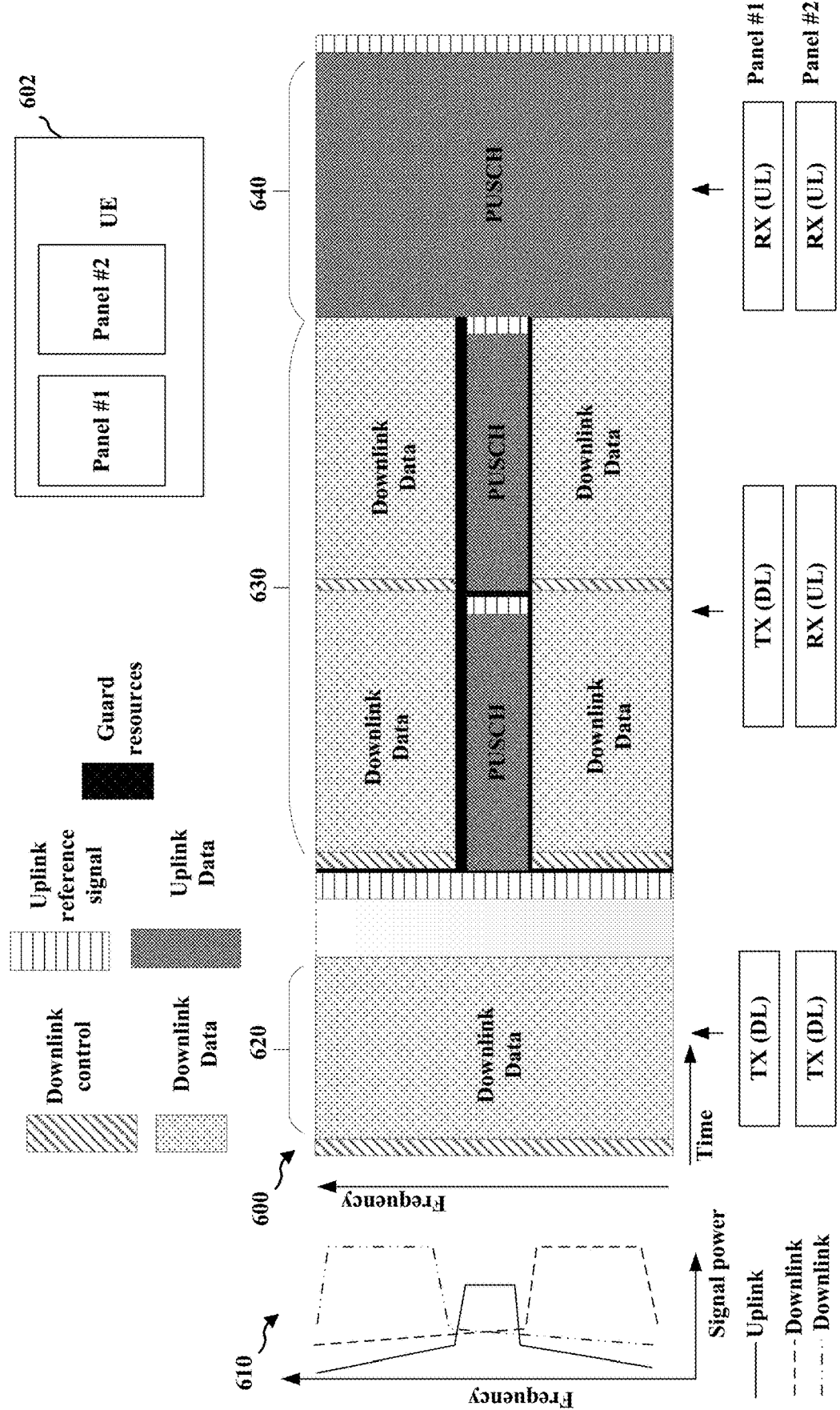
FIG. 6 is an example of time and frequency resources including full-duplex resources.

Some aspects presented herein may help to provide self-interference mitigation. Some aspects may help to improve isolation, such as greater than 50 dB. FIG. 6 illustrates an example device 602 that includes separate panels, e.g., antenna panels, for simultaneous transmission and reception in full-duplex operation. For example, the device 602 is illustrated to include a panel #1 and a panel #2. In some aspects, the panel #1 may be set up for downlink transmission. The downlink transmission may be at both edges of a frequency band, such as illustrated in 600 and 610. The panel #2 may be set up for uplink reception, such as using frequency resources within a frequency band, such as at the middle of the frequency band. Sub-band full-duplex operation, such as described in connection with FIG. 5C may be associated with an isolation of greater than 40 dB. As shown in FIG. 5C, the downlink and uplink resources may be in different portions, i.e., an uplink portion and a downlink portion, of a frequency band with a guard band between the uplink portion and the downlink portion of the frequency band. FIG. 6 illustrates an example set of time and frequency resources 600 that include both half-duplex and full-duplex periods. For example, a first time period 620 may include half-duplex resources for downlink data, and the panel #1 and the panel #2 may both receive downlink data during the first time period 620. A second time period 630 may include sub-band full-duplex resources for uplink transmissions (e.g., PUSCH) and downlink reception (e.g., downlink data), and the panel #1 may receive downlink data and the panel #2 may transmit PUSCH during the second time period 630. A third time period 640 may include half-duplex resources for uplink data, and the panel #1 and the panel #2 may both transmit PUSCH during the third time period 640. FIG. 6 also includes a graph 610 showing a signal power over frequency that shows that uplink and downlink signals leak outside of the frequency range provided in the sub-band full-duplex resources of the second time period 630.

A slot format may be referred to as a "D+U" slot when the slot has a frequency band that is used for both uplink and downlink transmissions. The downlink and uplink transmissions may occur in overlapping frequency resources, such as shown in FIGS. 5A and 5B (e.g., in-band full-duplex resources) or may occur in adjacent or slightly separated frequency resources, such as shown in FIG. 5C (e.g., sub-band full-duplex resources). In one aspect, the D+U symbol may include at least one of the uplink band or the downlink band, and a half-duplex device may either transmit in the uplink band or receive in the downlink band. In another aspect, the D+U symbol may include the uplink band and the downlink band, and a full-duplex device may transmit in the uplink band and receive in the downlink band in the same symbol or in the same slot. The D+U slot may include downlink symbols, uplink symbols, and full-duplex symbols. For example, in FIG. 6, the first time period 620 may extend for one or more symbols (e.g., downlink symbols), the third time period 640 may extend for one or more symbols (e.g., uplink symbols), and the second time period 630 may extend for one or more symbols (e.g., full-duplex symbols or D+U symbols).

In some aspects, the receiver may perform windowed overlap and add (WOLA) to reduce the adjacent channel leakage ratio (ACLR) for the leakage of the uplink signal. An analog low pass filter (LPF) may improve an analog-to-digital conversion (ADC) dynamic range. The receiver automatic gain control (AGC) states may be improved in order to improve the noise figure (NF). Digital interference cancelation may be applied to leakage having an ACLR greater than a threshold value, e.g., greater than 20 dB. In some examples, a non-linear model may be employed for each Tx-Rx pair.

Uplink power control may be used to mitigate self-interference in some aspects. For example, a full-duplex UE may reduce the uplink transmission power, which may reduce the interference caused to downlink reception in full-duplex slots through uplink power control. Similarly, a full-duplex base station may reduce the downlink transmission power to reduce the interference caused to uplink reception in full-duplex slots through downlink power control. In some examples, different uplink power control parameters may be applied for a full-duplex slot and a half-duplex slot. In some examples, sub-band power control parameters, such as uplink power control offset or scaling, may be applied differently for full-duplex operation and half-duplex operation.

Aspects presented herein may provide different power control parameters, e.g., uplink power control parameters, per sub-band. Uplink power control parameters per sub-band may provide more control and increased flexibility for reducing self-interference and also protecting the uplink transmission.

FIG. 7A illustrates an example communication system 700 with a full-duplex base station 702 that includes an intra-cell cross-link interference (CLI) to a first UE 704 by a second UE 706 that are located within the same cell coverage 710 and an inter-cell interference from another base station 708 outside of the cell coverage 710. FIG. 7B illustrates an example communication system 750 showing the inter-cell cross-link interference from a second UE 716 that interferences with downlink reception for a first UE 714. The first UE 714 is in the cell coverage 720 of the full-duplex base station 702, and the second UE 716 is in the cell coverage 722 of the base station 718. A full-duplex UE may also cause self-interference to its own downlink reception.

Figure 8:
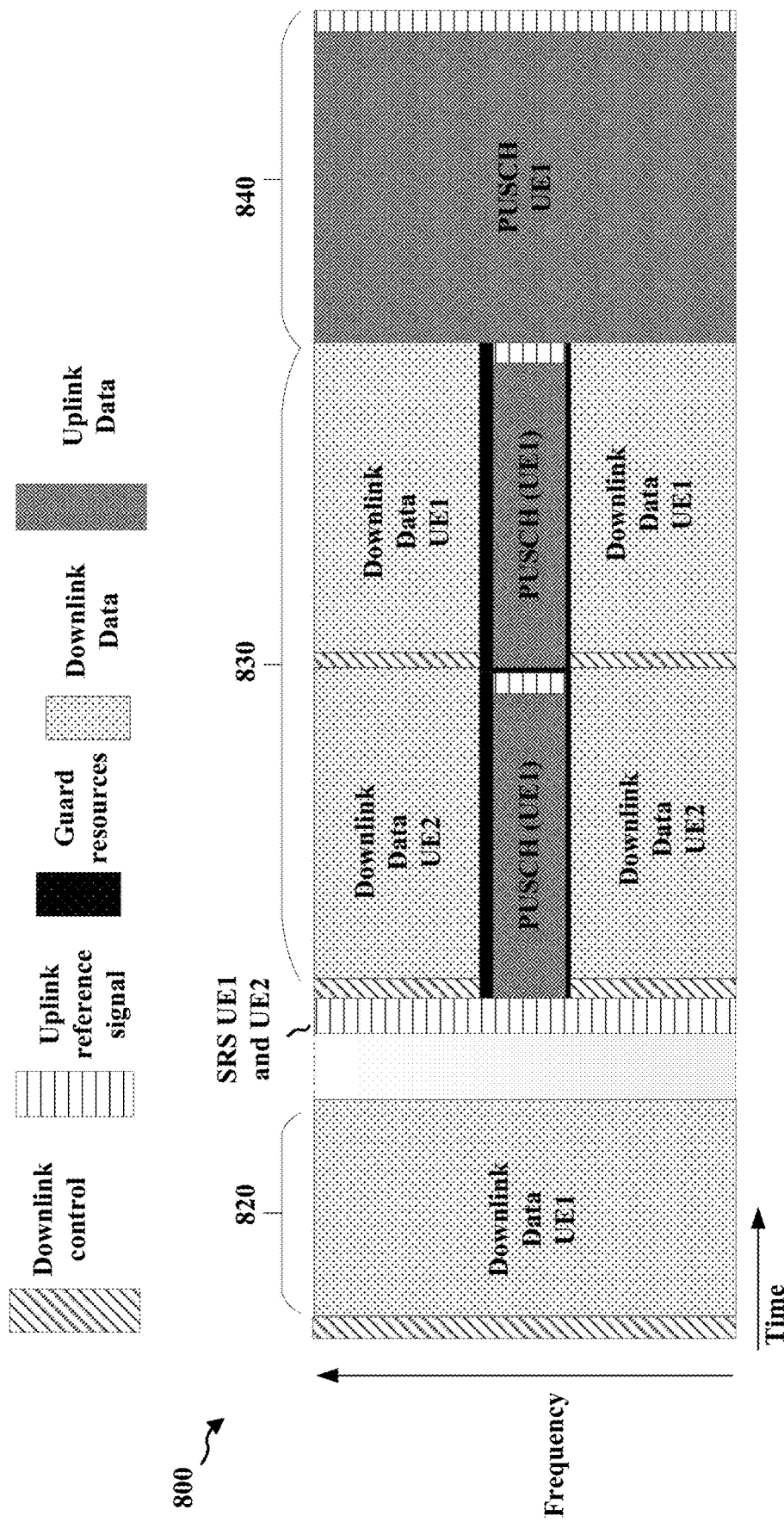
FIG. 8 illustrates an example of resources configured for sub-band full-duplex communication with multiple UEs.

In sub-band full-duplex (SBFD), a base station may configure a downlink transmission to a UE in frequency domain resources that are adjacent to frequency domain resources for uplink transmissions for another UE. For example, in FIG. 7A, the frequency resources for the downlink transmission to the first UE 704 may be adjacent to the frequency resources for the uplink transmission from the second UE 706. FIG. 8 illustrates an example 800 of frequency resources over time that include a first period 820 and a third period 840 for half-duplex communication and a second period 830 for full-duplex communication. The second period 830 may comprise one or more SBFD symbols, or D+U symbols, in which UE1 (e.g., second UE 706) transmits uplink communication to the base station (e.g., base station 702) within a frequency band that includes frequency resources for UE2 (e.g., first UE 704) to receive downlink transmissions from the base station (e.g., base station 702). The uplink transmission from UE1 may cause interference to the downlink reception of UE 2 during the second period 830.

Figure 9:
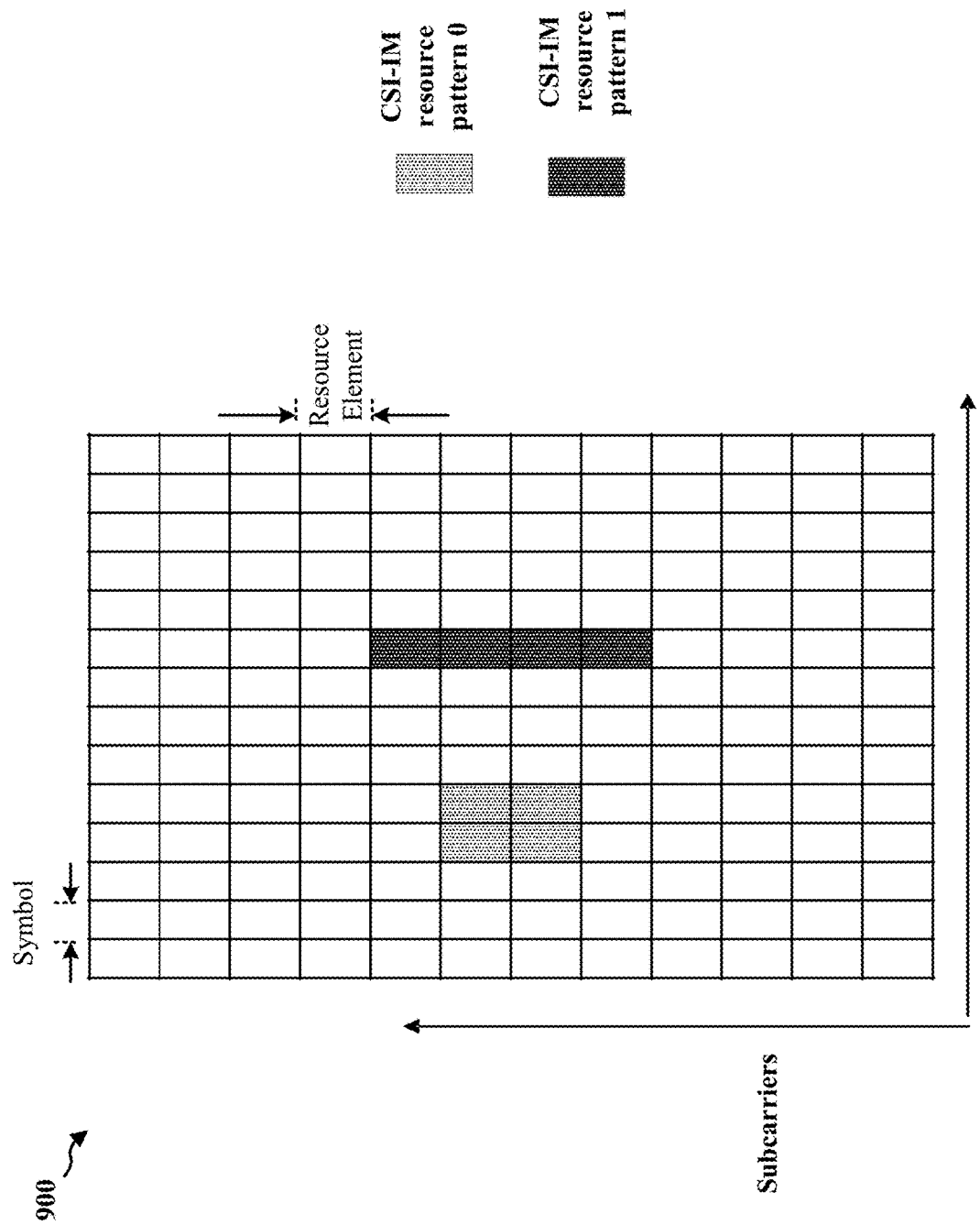
FIG. 9 illustrates an example of channel state information (CSI) interference measure (IM) (CSI-IM) resources.

A base station may configure channel state information (CSI) interference measure (IM) (CSI-IM) resources for interference measurements to enable accurate CSI reporting that reflects inter-cell interference. FIG. 9 illustrates two example patterns of CSI-IM resources 900. A first pattern, which may be referred to as Pattern 0, may include two contiguous resource elements in two contiguous symbols. The second pattern, which may be referred to as Pattern 1, may include four contiguous resource elements in a single symbol. The size of the CSI-IM resource in the frequency domain may be configured based on a starting resource block and a number of resource blocks. The base station may transmit to the UE a CSI report configuration indicating the CSI-IM resource set for the UE to use for interference measurements. The UE may then use the configured CSI-IM resources to measure interference at the UE and report such interference to the base station based on the CSI report configuration.

Figure 10:
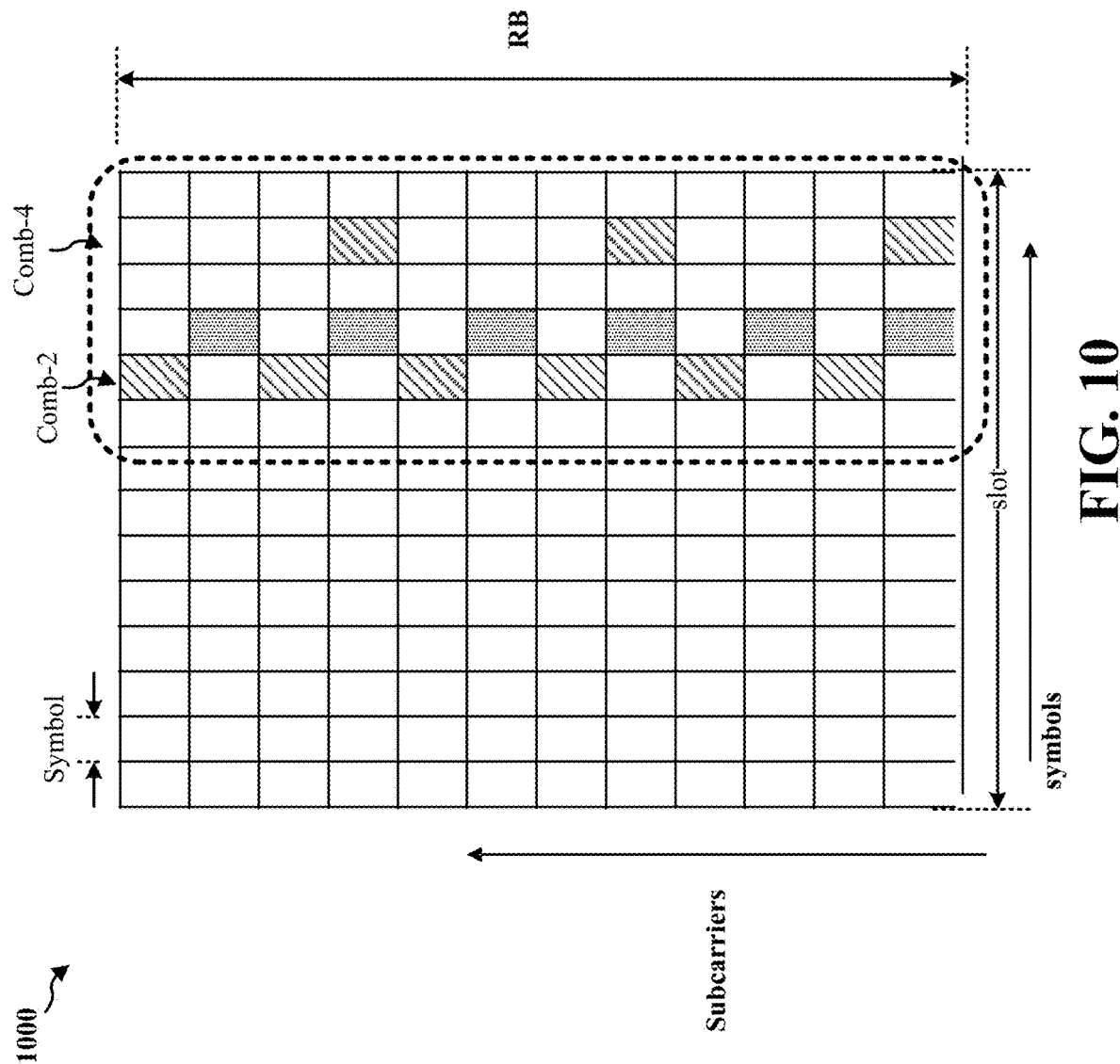
FIG. 10 illustrates an example of sounding reference signal (SRS) resources.

FIG. 10 illustrates examples of SRS resources 1000 for an uplink reference signal transmission by a UE. The SRS may be used by another UE to perform interference measurements. The SRS resources may be mapped to physical resources in a resource block. In time, the SRS resources may span up to four symbols and may be configured in the last six symbols of a slot. In the frequency domain, a comb-2 or a comb-4 SRS can be configured with a comb offset. The SRS resources may be configured in time and frequency. For example, the SRS resources may be periodic, aperiodic, or semi-persistent. The SRS may be configured with a periodicity and a slot offset, for example. The SRS may be configured for a sounding bandwidth within a bandwidth part (BWP). The SRS may be configured with a frequency hopping pattern.

For example, the comb-2 SRS may have a pattern of SRS signals on every other subcarrier over the BWP in each slot. The comb-2 SRS may span for 2 slots, and the first slot and the second slot may have alternating patterns of SRS signal. The comb-4 SRS may have a pattern of SRS signals on every 4 subcarriers over the bandwidth for each slot. The comb-2 SRS and the comb-4 SRS may have one slot of comb offset.

Figure 11:
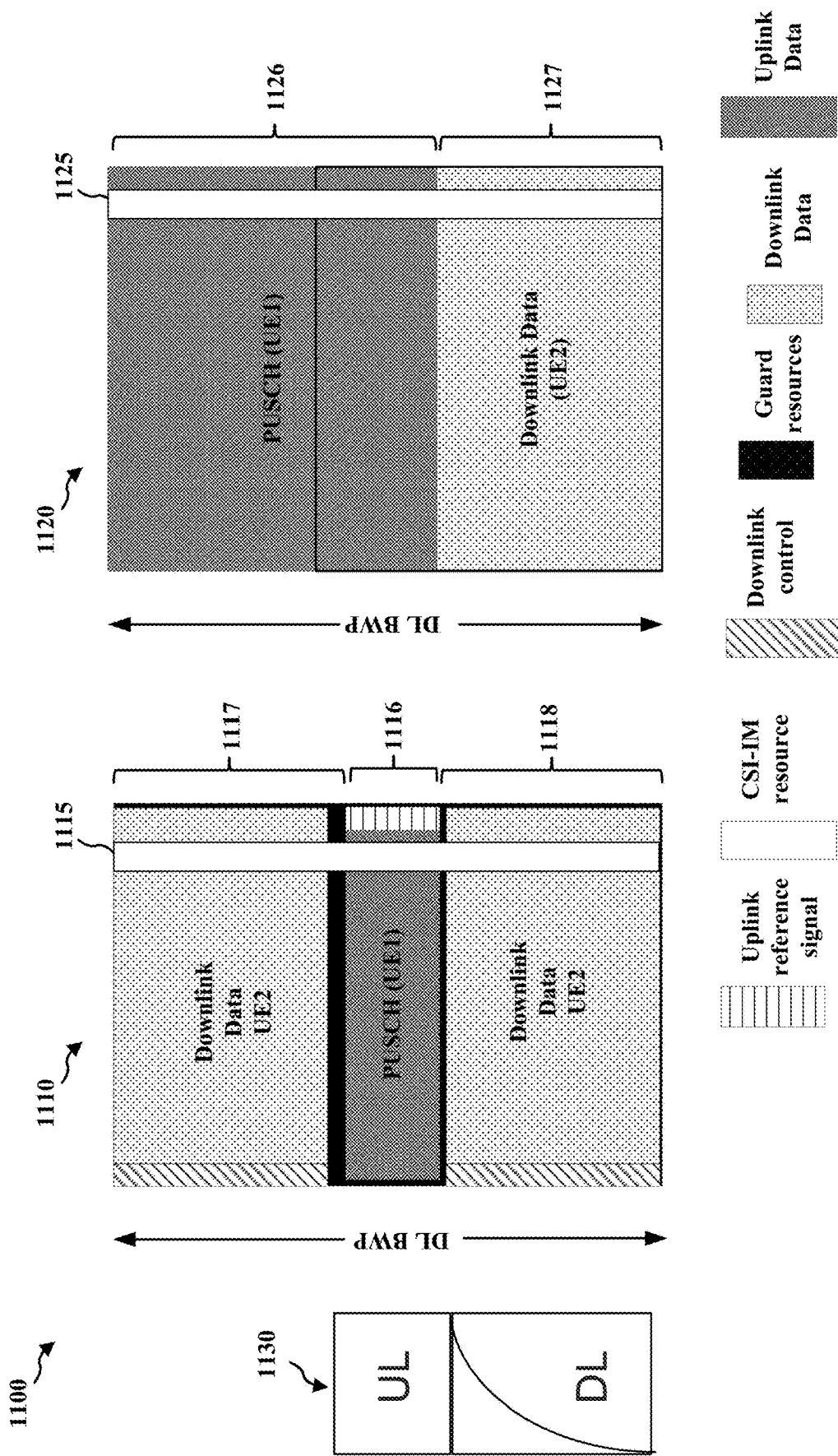
FIG. 11 illustrates examples of CSI-IM resources of full-duplex resources of wireless communication.

FIG. 11 illustrates examples 1100 and 1120 of CSI-IM resources of full-duplex resources of wireless communication. The intra-cell CLI, e.g., CLI from UL transmissions of nearby users in IBFD or CLI leakage to DL from UL transmissions in SBFD mode, can limit the performance of UEs. In SBFD and/or IBFD modes, the base station may configure the CSI-IM in both of the UL and DL (whole DL BWP) in a full-duplex slot to enable a full-duplex aware UE and/or a full-duplex UE to measure different components of interference. That is, the base station may configure the CSI-IM in the whole DL BWP in a full-duplex slot and instruct the UEs to configure the CSI-IM in the UL channel to measure different components of interference.

In the SBFD example 1110, the CSI-IM resources 1115 includes downlink portions 1117 and 1118 that may be subject to inter-cell interference and CLI leakage and an uplink portion 1116 that may mainly include CLI interference. The IBFD example 1120 includes CSI-IM resources 1125 having a portion 1126 that is subject to CLI and a portion 1127 that is subject to inter-cell interference and CLI leakage. The intra-cell CLI may limit the performance of the affected UEs. As described in connection with FIGS. 4A, 4B, 4C, and 7A, the CLI may be caused by the uplink transmissions of nearby users in an IBFD mode or the CLI leakage to downlink reception in the SBFD mode. For full-duplex communication, the base station may configure the CSI-IM resources to extend in both the uplink and downlink portions of DL BWP in a full-duplex slot. The CSI-IM resources may enable the UE 2, which is full-duplex aware or full-duplex capable, to measure different components of interference. The UE2 may measure interference levels in the configured CSI-IM resources, e.g., 1115 or 1125. The UE2 may calculate the contribution of CLI, e.g., based on a wideband or sub-band received signal strength indication (RSSI). For example, graph 1130 showing the CLI leakage over frequency measured by the UE2 illustrates that the signal power of the CLI leakage is the strongest near the uplink channel transmitted by the UE1.

Here, the UE2 may be a victim UE, and the UE2 may be configured to measure the CLI based on an uplink reference signal of nearby aggressor UEs, including the UE1, e.g., such as based on an SRS transmission. That is, the base station may configure the aggressor UE1 with the SRS transmission in the UL portion of the DL BWP, and the base station may configure the victim UE2 with the CSI-IM resources. That is, the victim UE2 may detect the SRS in the CSI-IM overlapping with the CSI-IM resources. Accordingly, the base station may configure the CSI-IM to match the SRS allocation in the UL of the aggressor UE1. The victim UE may measure the CLI in the configured CSI-IM resources, e.g., RSSI, in the uplink portions 1116 or 1126, or the downlink portions 1117, 1118, or 1127, and measure a reference signal received power (RSRP) and/or a reference signal received quality (RSRQ) in sub-band corresponding to SRS transmission in the uplink portions 1116 or 1126.

Figure 12:
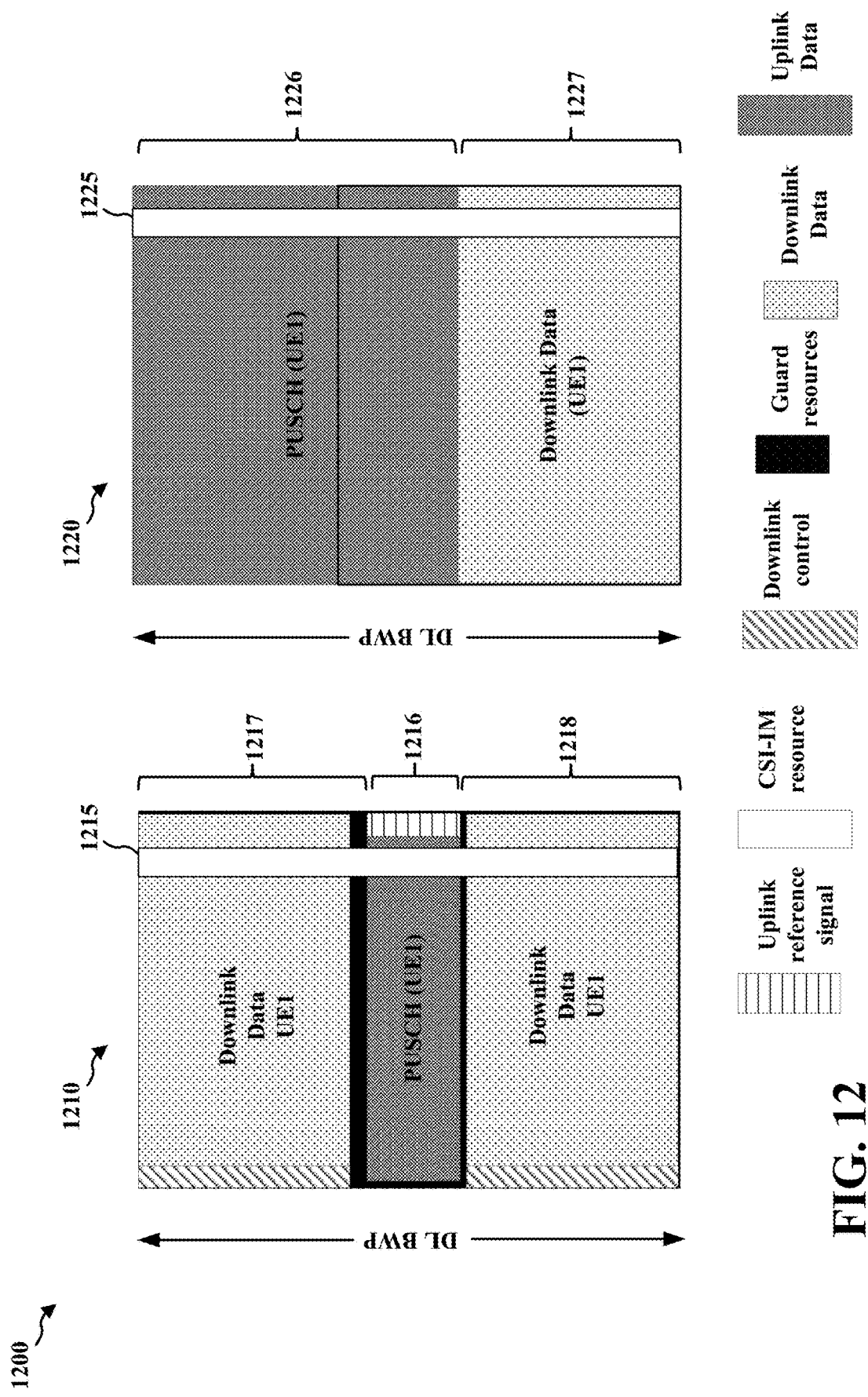
FIG. 12 illustrates examples of CSI-IM resources of full-duplex resources of wireless communication.

FIG. 12 illustrates examples of CSI-IM resources 1200 of full-duplex resources of wireless communication. The intra-UE CLI or the self-interference may limit the performance of full-duplex UEs. In SBFD and/or IBFD mode, the base station may configure a full-duplex UE with the CSI-IM resources for the self-interference measurement. The UE may measure interference power in configured CSI-IM resources and calculates the wideband/sub-band self-interference, e.g., RSSI. The base station may also configure the full-duplex UE with the SRS in the UL portion and CSI-IM resources that matches the SRS allocation in SRS BW. The UE may calculate self-interference, e.g., RSSI, RSRP, RSRQ, based on the SRS.

In the SBFD example 1210, the CSI-IM resources 1215 may include downlink portions 1217 and 1218 that may be subject to self-interference from the CLI leakage and an uplink portion 1216 that may mainly include the CLI of self-interference. The IBFD example 1220 includes CSI-IM resources 1225 having a portion 1226 that is subject to CLI of self-interference and a portion 1227 that is subject to self-interference from the CLI leakage. The self-interference may limit the performance of the full-duplex UE1. As described in connection with FIGS. 4A, 4B, 4C, and 7A, the self-interference may be from the uplink transmission of the UE1 in the IBFD mode or due to CLI leakage to downlink reception from the uplink transmission of the UE1 in the SBFD mode. For full-duplex communication, a base station may configure CSI-IM resources to extend in both the uplink and downlink portions of DL BWP in a full-duplex slot. The CSI-IM resources may enable a full-duplex UE1 to measure different components of interference. The UE1 may measure interference levels in the configured CSI-IM resources, e.g., 1215 or 1225. The UE1 may calculate the contribution of self-interference, e.g., based on a wideband or sub-band received signal strength indication (RSSI).

Here, the UE1 may be configured to measure the self-interference based on an uplink reference signal of the UE1, e.g., based on an SRS transmission. That is, the base station may configure the full-duplex UE1 with SRS transmission in the UL portion and the UE1 with CSI-IM resources. That is, the full-duplex UE1 may detect the SRS in the CSI-IM overlapping with the CSI-IM resources. The base station may configure the CSI-IM to match the SRS allocation in the UL of the full-duplex UE1. Accordingly, the full-duplex UE1 may measure the CLI in the configured CSI-IM resources, e.g., RSSI, in the portions 1216, 1217, 1218, 1226, and 1227, and measure RSRP and/or the RSRQ in sub-band corresponding to SRS transmission in the portion 1216 and 1226.

Figure 13:
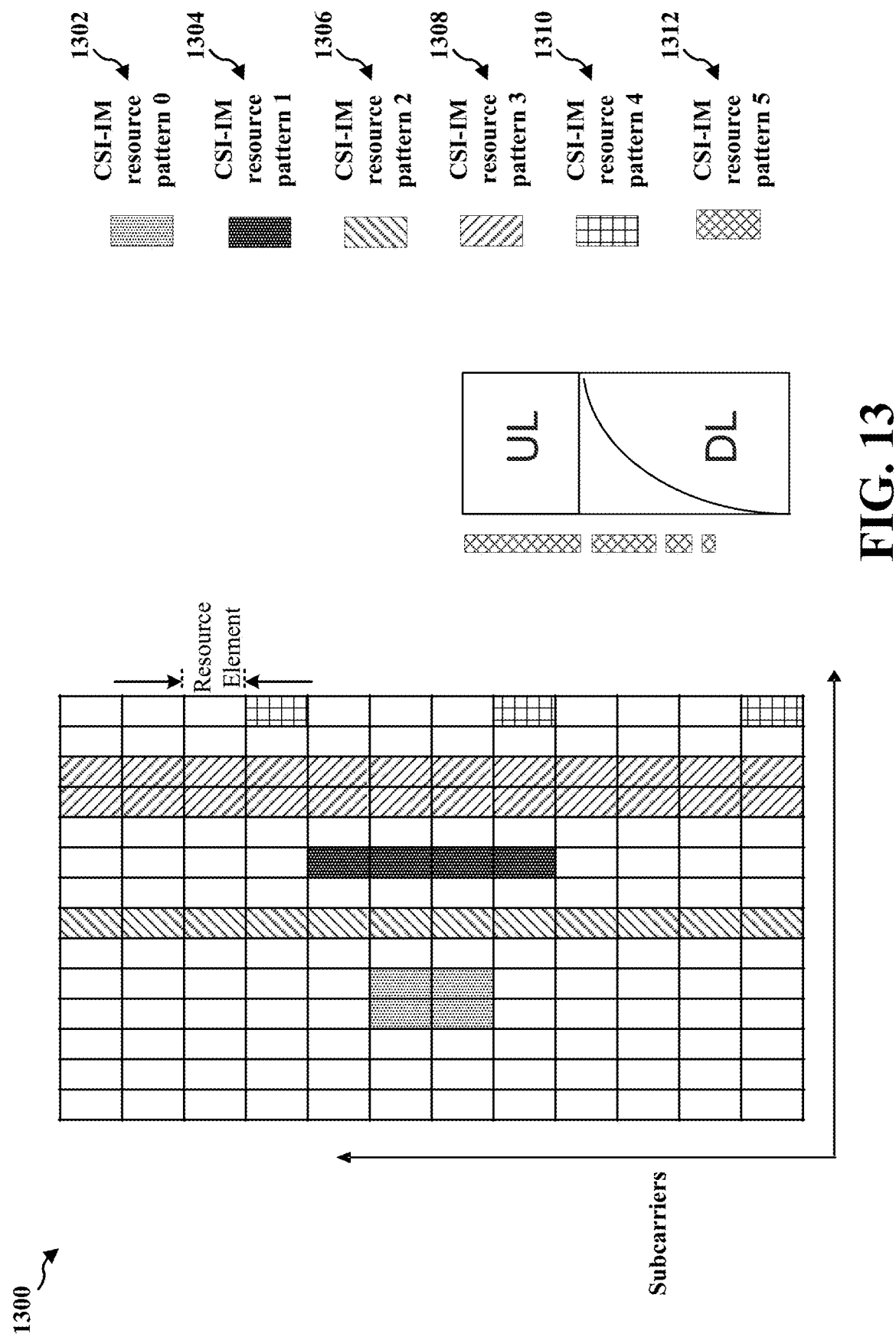
FIG. 13 illustrates configurations of CSI-IM resources of wireless communication.

FIG. 13 illustrates configurations 1300 of CSI-IM resources of wireless communication. Referring again to FIG. 9, the CSI-IM resource pattern 0 1302 and the CSI-IM resource pattern 1 1304 of FIG. 13 correspond to the pattern 0 and the pattern 1 of FIG. 9. The base station may configure additional patterns for CSI-IM resources to enable accurate CLI measurement and reporting based on a full-duplex mode, allocation of the reference signals transmitted by the UE, and/or corresponding channels. In some aspects, a CSI-IM resource pattern may have a dense pattern spanning multiple resource elements in the frequency domain and multiple slots, which can be used to measure interference in the UL portion of the full-duplex slot. A density of a resource pattern may refer to a ratio of CSI-IM resources. As an example, a dense pattern may have a ratio of CSI-IM resources to non-CSI-IM resources exceeding six resource elements per RB. A sparse pattern may refer to a resource pattern having a lower ratio of resources for CSI-IM. As an example, a sparse pattern may have a ratio of CSI-IM resources to non-CSI-IM resources that is less than a threshold, e.g., less than six resource elements per RB. In one aspect, a CSI-IM resource pattern 2 1306 may have a pattern of CSI-IM resource elements allocated contiguously through the DL BWP in the frequency domain for one slot. In another aspect, a CSI-IM resource pattern 3 1308 may have a pattern of CSI-IM resource elements allocated contiguously through the DL BWP in the frequency domain and further spanning multiple symbols.

In some aspects, the CSI-IM resource pattern may match the corresponding SRS patterns, such as the comb-2 CSI-IM or the comb-4 CSI-IM, as illustrated in FIG. 9. For example, a CSI-IM resource pattern 4 1310 illustrates a CSI-IM pattern matching the SRS patterns of comb-4 CSI-IM of FIG. 9.

In some aspects, the CSI-IM resource pattern may have a more flexible frequency domain resource configuration. In one aspect, a CSI-IM resource pattern 5 1312 illustrates a CSI-IM pattern having more flexible frequency domain resource configuration for CSI-IM to enable sparse allocation away from UL as leakage from CLI decreases. That is, the CSI-IM resource pattern 5 1312 may have a first set of the CSI-IM resource elements contiguously allocated in the frequency domain in the UL portion of the CSI-IM resources, and a second set of the CSI-IM resource elements allocated in the frequency domain in the DL portion of the CSI-IM having a larger number of CSI-IM resources elements allocated in a certain number of resource elements closer to the UL portion of the CSI-IM resources. That is, the second set of the CSI-IM resource elements allocated in the frequency domain in the DL portion of the CSI-IM may have a fewer number of CSI-IM resource elements allocated in the certain number of resource elements farther from the UL portion of the CSI-IM resources. Since the CSI leakage is strongest near the UL, the flexible frequency domain resource configuration of the CSI-IM resource pattern 5 1312 may save resources for the PDSCH transmission.

Figure 14A:
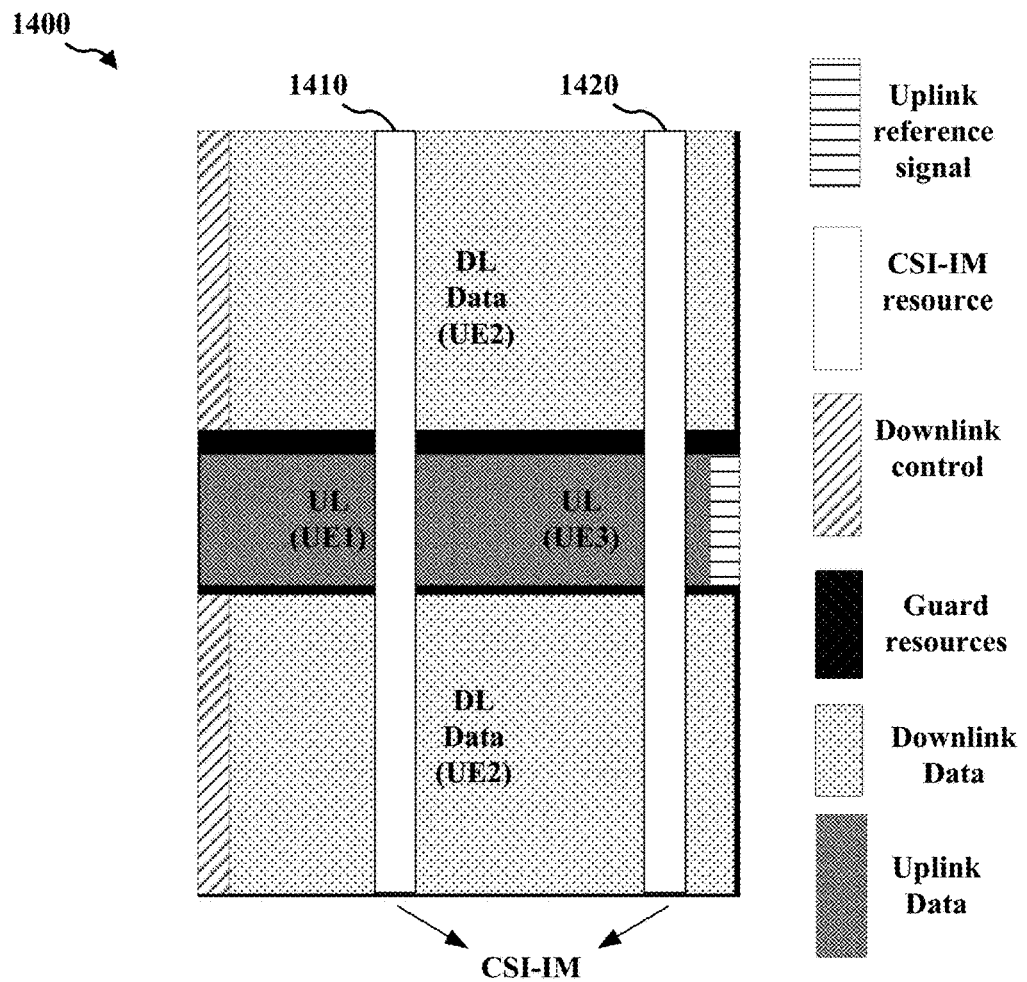
FIG. 14A illustrates an example of CLI reporting of wireless communication.
Figure 14B:
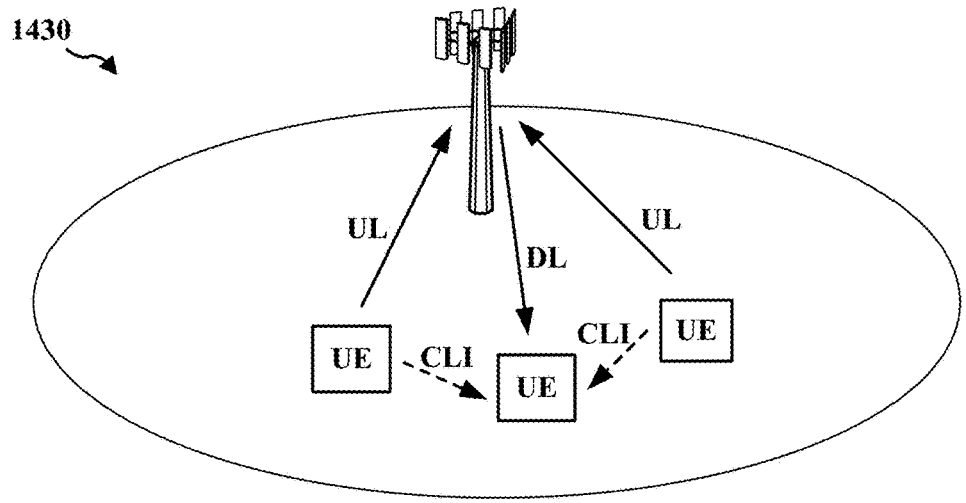
FIG. 14B illustrates a diagram of a method of wireless communication.

FIG. 14A illustrates an example 1400 of CLI reporting of wireless communication. FIG. 14B illustrates a diagram 1430 of a method of wireless communication. The diagram 1430 shows two aggressor UEs, UE1 and UE3, and one victim UE, UE2. The base station may configure the victim UE2 with two CSI-IM resource sets 1410 and 1420 to measure the CLI leakage from the UL transmissions of the aggressor UE1 and the aggressor UE3. The base station may transmit a report quantity CLI-RSSI to the victim UE2 to trigger the UE2 to generate and transmit one or two CSI reports of the two CSI-IM resource sets 1410 and 1420. For example, the victim UE2 may measure the interference in the two configured CSI-IM resources 1410 and 1420 and report, to the base station, the one or two CLI reports including the RSSI values measured in the two configured CSI-IM resources 1410 and 1420.

Figure 15:
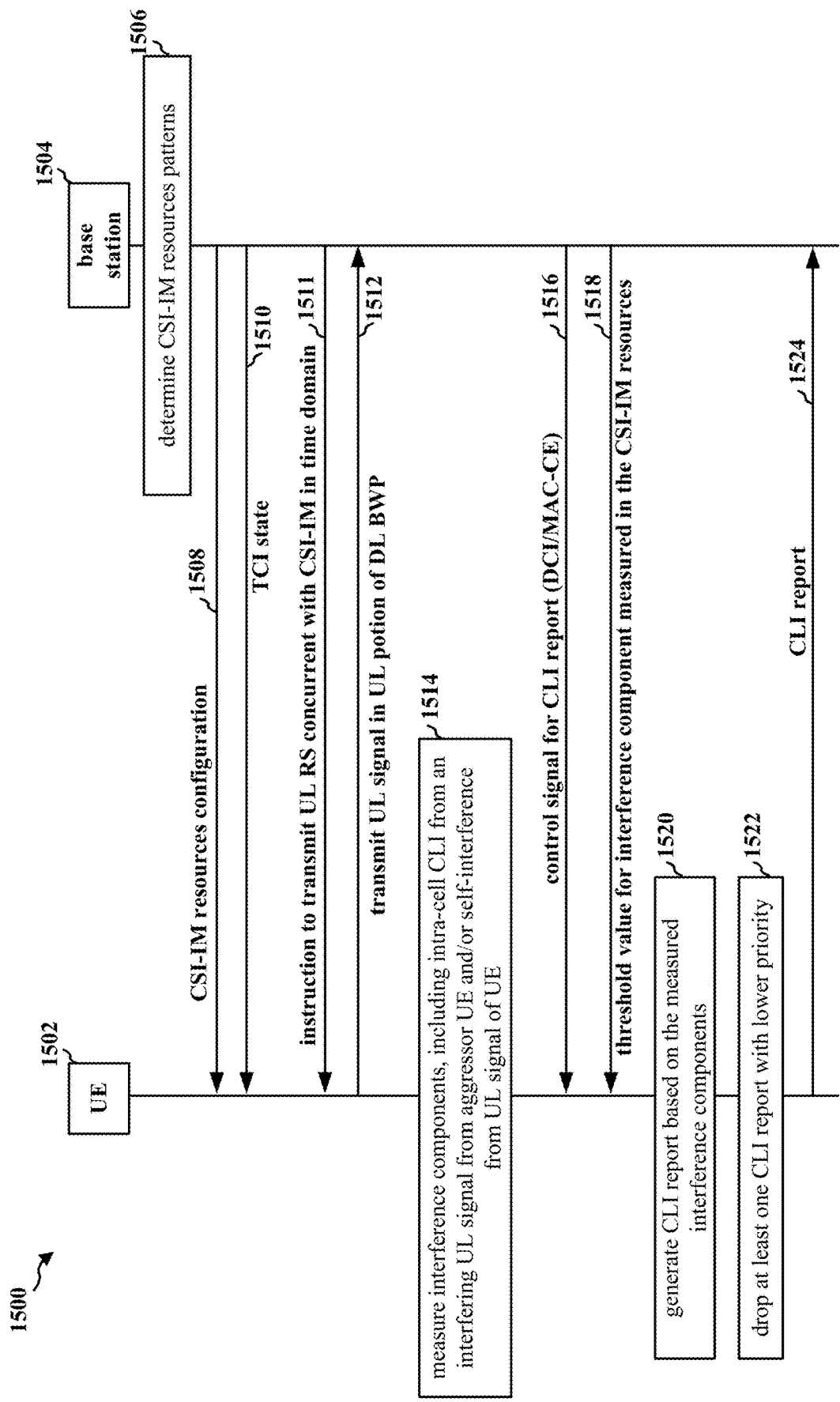
FIG. 15 is a call-flow diagram of a method of wireless communication.

FIG. 15 is a call-flow diagram 1500 of a method of wireless communication. The call-flow diagram 1500 may include a UE 1502 and a base station 1504. The base station 1504 may configure CSI-IM resources in a DL BWP of a full-duplex slot, and the UE 1502 may measure interference components in the CSI-IM resources and generate and/or transmit a CLI report including the measurement of the interference components to the base station 1504.

At 1506, the base station 1504 may determine the CSI-IM resource patterns. Referring again to FIG. 13, the base station 1504 may configure patterns for CSI-IM resources to enable accurate CLI measurement and reporting based on a full-duplex mode and/or allocation of the reference signals transmitted by the UE and/or corresponding channels. In one aspect, the CSI-IM resources pattern, e.g., the CSI-IM resource pattern 2 1306 of FIG. 13, may have a dense pattern in the frequency domain which can be used to measure interference in the UL portion of the full-duplex slot. In another aspect, the CSI-IM resources pattern, e.g., the CSI-IM resource pattern 3 1308 of FIG. 13, may have a pattern further spanning multiple symbols. In another aspect, the CSI-IM resources pattern, e.g., the CSI-IM resource pattern 4 1310 of FIG. 13, may be provided to match the SRS patterns, e.g., the SRS patterns illustrated in FIG. 10. In another aspect, the CSI-IM resource pattern, e.g., the CSI-IM resource pattern 5 1312, may have a flexible frequency domain resource configuration for CSI-IM to enable sparse allocation away from UL as leakage from CLI decreases.

At 1508, the base station 1504 may transmit a configuration for one or more CSI-IM resources in a BWP to the UE 1502, and the UE 1502 may receive, from the base station 1504, the configuration for one or more CSI-IM resources in the BWP. The CSI-IM resources configuration may notify the UE 1502 of the CSI-IM resources that the base station 1504 may configure in the downlink BWP in the full-duplex mode and instruct the UE 1502 to measure the interference components in the configured CSI-IM resources.

In one aspect, the base station 1504 may configure the UE 1502 to measure the CLI with certain spatial reception parameters. At 1510, the base station 1504 may define a TCI state to indicate spatial receiver parameters, and the UE may be configured to measure the CSI-IM resources based on the spatial receiver parameters, e.g., QCL-TypeD, and signal the TCI state to the UE 1502. The UE may receive, from the base station 1504, the TCI state defined to indicate the spatial receiver parameters, and the UE may be configured to measure the CSI-IM resources based on the spatial receiver parameters. The TCI state may be signaled to the UE 1502 in a similar manner to transmitting the configuration for one or more CSI-IM resources at 1508.

At 1511, the base station 1504 may configure the UE 1502 to transmit a UL reference signal concurrent with the CSI-IM resources in the time domain, and UE 1502 may receive, from the base station 1504, the configuration to transmit the UL reference signal concurrent with the CSI-IM resources in the time domain. The base station 1504 may also configure another UE, e.g., the aggressor UE, to transmit the UL reference signal concurrent with the CSI-IM resources in the time domain. In one aspect, the UL reference signal may be the SRS. The UE 1502 may measure at least one interference component in the CSI-IM resources based on the UL reference signal that the aggressor UE and/or the UE 1502 transmit concurrently with the CSI-IM resources in the time domain.

At 1512, the UE 1502 may transmit an uplink signal to the base station in an uplink portion of the downlink BWP based on the configuration received from the base station 1504 at 1511. The UE 1502 may measure the interference in the CSI-IM resources in the downlink BWP. In some aspects, the uplink signal may include the UL reference signal concurrent with the CSI-IM resources in the time domain, based on the configuration received at 1511 from the base station. The UE measure at least one of an RSSI, an RSRP, or an RSRQ of the interference in the CSI-IM resources in the uplink portion of the downlink BWP, based on the uplink reference signal.

At 1514, the UE 1502 may measure at least one interference component (e.g., RSSI) in the CSI-IM resources configured by the base station in the downlink BWP. At least one interference component in the CSI-IM resources may be caused by the interfering UL signal and/or the interference component (e.g., RSSI, RSRP, RSRQ) in the CSI-IM resources from the reference signal (e.g., SRS) in the interfering UL signal. The interference components may include the intra-cell CLI from the interfering UL signal from aggressor UE and/or the self-interference from UL signal of the UE 1502. In one aspect, the interfering UL signal from the aggressor UE and/or the UL signal of the UE 1502 may be the UL reference signal transmitted concurrently with the CSI-IM resources in the time domain as configured by the base station 1504 at 1510.

In some aspects, the UE 1502 may measure at least one interference component in the CSI-IM resources configured by the base station in the downlink BWP. That is, the CSI-IM resources may be measured based on spatial receiver parameters indicated by the TCI state defined by the base station 1504 at 1510. For example, The TCI state can also be configured in an aperiodic trigger state for aperiodic CLI-report. The aperiodic trigger stage may include a list of TCI states associated with the CSI-IM resource set, including multiple CSI-IM resources.

In some aspects, generating the CLI report may be triggered by a control signal for the CLI report. At 1516, the base station 1504 may transmit, to the UE 1502, the control signal to instruct the UE to generate and transmit the CLI report. The UE 1502 may receive, from the base station 1504, the control signal to instruct the UE to generate and transmit the CLI report. The control signal for the CLI report may have various formats. The control signal may include at least one of the CSI report configurations identifying a report quantity for reporting the CLI or separate CLI report configurations for reporting the CLI. That is, the control signal for the CLI report may be configured with the report quantity of a CSI report configuration. The CSI report configuration may include report quantity, which may identify the quantities to be included in the CSI report. The base station 1504 may define and configure a new report quantity for the UE 1502 to report the CLI. The new report quantity may be, for example, CLI-RSSI, CLI-RSRP, or CLI-RSRQ, each identifying the quantities of the RSSI, RSRP, or RSRQ measurements to be included in the CLI report. In another example, the base station 1504 may define a new and separate CLI report configuration for reporting the intra-cell CLI report and the self-interference CLI report and transmit the separate CLI report configuration to the UE 1502.

At 1518, the base station 1504 may transmit, to the UE 1502, a threshold value for the measurement of at least one interference component in the CSI-IM resources, and the UE 1502 may receive, from the base station 1504, the threshold value for the measurement of at least one interference component in the CSI-IM resources. The UE 1502 may generate the CLI report in response to the measurement of at least one interference component in the CSI-IM resources being above the threshold value. To reduce reporting overhead, the base station 1504 may transmit semi-statically (e.g., via RRC message) or dynamically the threshold for CLI to the UE 1502. The UE 1502 may drop the CLI report if the measured CLI falls below the threshold. In case the UE 1502 is configured to measure and report multiple CLI values for different resources, the UE 1502 may report the measurement of the interference components (e.g., CLI-RSSI) that are above the threshold value.

At 1520, the UE 1502 may generate the CLI report based on the interference components measured in the configured CSI-IM resources. In some aspects, the UE 1502 may determine the periodicity of the CLI report based on the control signal received from the base station 1504 at 1516. The time-domain behavior of CLI report may depend on the periodicity of the CSI-IM resources. That is, the periodicity of the CLI report may be configured based on whether the CSI-IM resources are configured periodically, semi-persistently, or aperiodically. For example, the periodic CSI-IM may support the periodic, the semi-persistent, and the aperiodic CLI report. The semi-persistent CSI-IM may support the semi-persistent and the aperiodic CLI report. Also, the aperiodic CSI-IM may support aperiodic CLI reports.

In some aspects, the periodicity of the CLI report may also be determined based on the control signal for the CLI report. The control signal for the CLI report may be dynamically transmitted in the DCI or semi-statically transmitted in the MAC-CE. The control signal dynamically transmitted in the DCI may trigger the aperiodic CLI-report or the semi-persistent CLI-report, and the aperiodic CLI-report and the semi-persistent CLI-report activated by the DCI may be transmitted on the PUSCH. For example, an aperiodic CLI report may refer to a report that the UE does not send until a trigger occurs, e.g., until the base station requests or otherwise indicates for the UE to send the CLI report. In contrast, a periodic CLI report may refer to a report that the UE periodically transmits, e.g., based on a repeating pattern such as in resources that occur each period of time. A semi-persistent or semi-static CLI report may refer to a report that is transmitted in a periodic manner for a duration of time. The pattern of reports may be activated or deactivated. The control signal semi-statically transmitted in the MAC-CE may trigger the semi-persistent CLI-report, and the semi-persistent CLI-report activated by the MAC-CE may be transmitted on the PUCCH.

In one aspect, the UE 1502 may determine the granularities of the CLI reports. The granularity of the CLI report may refer to a width of the frequency range covered by the CI report. For example, different frequency granularities for interference reporting can be configured, e.g., wideband reporting and sub-band reporting. Sub-band reporting may be considered to have a higher level of granularity than wideband reporting. In another aspect, for sub-band reporting, the UE 1502 may report an average of measured interference components (e.g., RSSI, RSRP, or RSRQ) and delta values for each of the sub-bands or report the measured interference components (e.g., RSSI, RSRP, or RSRQ) value for each sub-band. In another aspect, the CLI report may also be associated with multiple CSI-IM resource sets for CLI reporting from different nearby UEs.

In some aspects, the CLI report may have various timeline requirements. The control signal for the CLI report received at 1516 may include the timeline requirement of the CLI report. In one aspect, the timeline requirement of the CLI report may follow the CSI reporting timeline requirement. That is, a wideband CLI report may follow the low latency class, and the sub-band CLI report may follow the high latency class. In another example, the base station 1504 may define a separate timeline requirement for the CLI reports. In another aspect, the timeline requirement of the CLI report may be configured differently than the timeline requirement of the CSI reporting timeline requirement. That is, the processing time required for the UE 1502 to process the CLI report may be configured shorter than the CSI report. For example, the UE 1502 may only be measuring the RSSI, RSRP, and/or RSRQ, and the time required for the UE 1502 to generate and send the CLI report may be configured shorter than the CSI report.

The CLI report from the UE 1502 may be sent to the base station 1504 on the PUSCH or the PUCCH. The base station 1504 may limit the number of CLI reports being sent on the payload of the PUCCH to a number of bits. The size of the payload of the CLI report may be limited to a threshold size. That is, the size of the payload of the CLI report may be limited to the first number of bits. In one aspect, the CLI report may include a wideband CLI report transmitted on a PUCCH, and the size of the CLI report may be limited to the first number of bits. In another aspect, the CLI report limited to the first number of bits may include a wideband CLI report and a maximum number of sub-band CLI reports. Accordingly, depending on the payload size, we may transmit only the wideband CLI on the PUCCH or report the wideband CLI measurement with a maximum number of sub-band CLI measurements permissible within the limited number of bits allocated on the PUCCH.

In some aspects, the CLI measurement to be sent on PUSCH may be ordered by their priority. That is, the CLI measurements to be included in the CLI report may be prioritized, and the UE 1502 may order the CLI measurements to be transmitted to the base station 1504 on the PUSCH based on the priority of the CLI measurements. For example, the wideband CLI measurement may be transmitted, followed by the sub-band CLI measurements, since the wideband CLI measurement has a higher priority. In case there are multiple sub-band CLI measurements, the multiple sub-band CLI measurements may be ordered by their priority and/or value. The sub-band CLI measurement with low priority and/or value may be dropped based on resources available in the PUSCH to transmit the generated CLI reports. That is, the UE may determine that the resources available in the PUSCH may not be enough to transmit all of the generated multiple sub-band CLI measurements, and the UE may determine to drop at least one of multiple sub-band CLI measurements that has low priority and/or value.

In some aspects, two or more CLI reports may be scheduled to be transmitted simultaneously, and the UE might not have enough resources to send all reports. At 1522, the UE 1502 may drop at least one CLI report with a low priority based on resources available in the PUSCH to transmit the generated CLI reports. For example, reports may be prioritized according to their time-domain behavior and content.

At 1524, the UE 1502 may transmit the generated CLI report to the base station 1504, and the base station 1504 may receive the CLI report generated by the UE 1502.

Figure 16A:
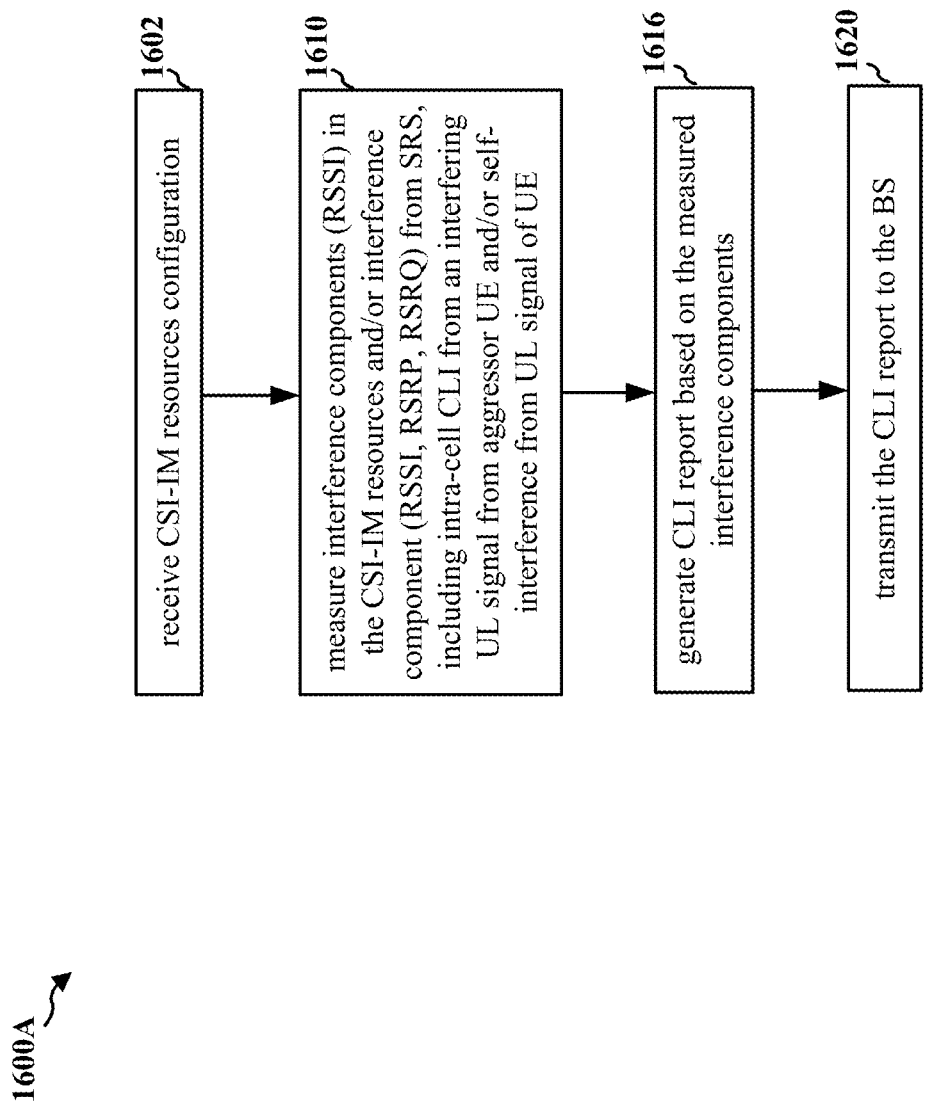
FIGS. 16A and 16B are flowcharts of a method of wireless communication.
Figure 16B:
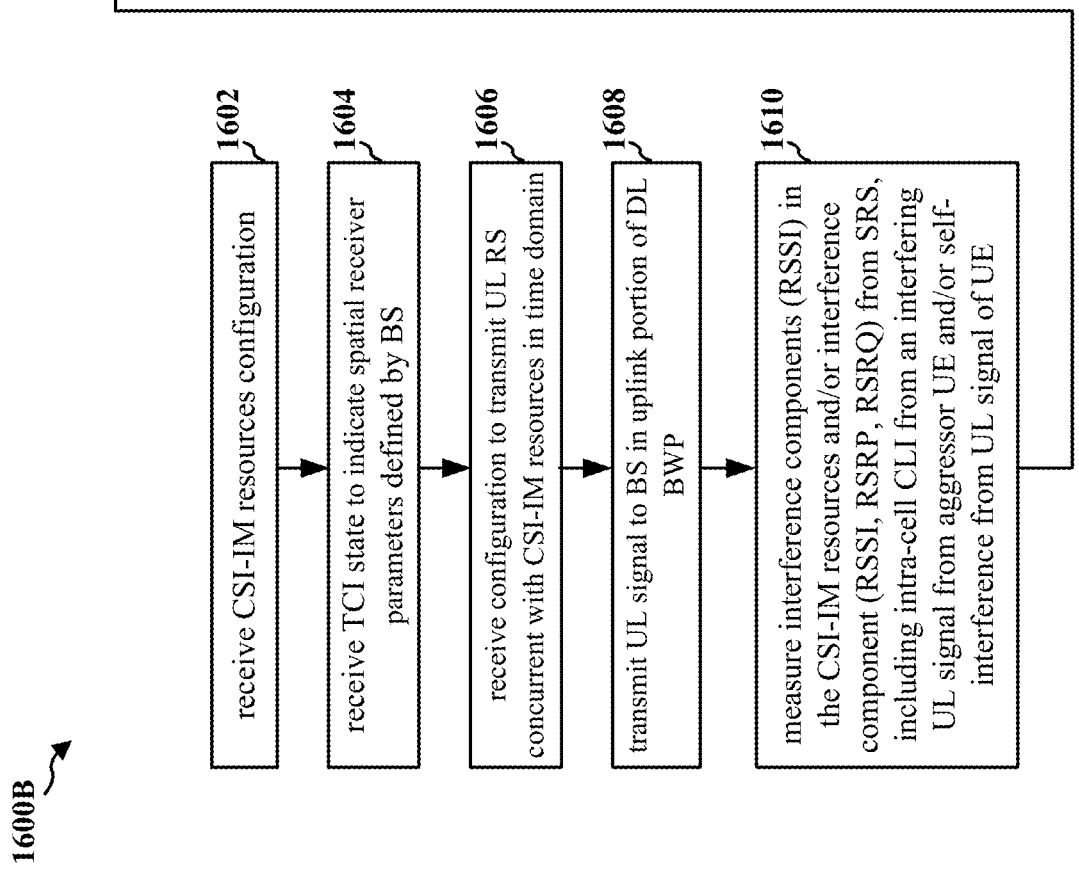

FIGS. 16A and 16B are flowcharts 1600A and 1600B of a method of wireless communication. The method may be performed by a UE (e.g., the UE 104/704/714/1502; the apparatus 1802). The UE may receive, from a base station, a configuration of CSI-IM resources for measuring intra-cell interferences or self-interferences in full-duplex communication and generate and transmit the CLI report to the base station based on the configuration of the CSI-IM resources.

At 1602, the UE may receive, from a base station, a configuration for one or more CSI-IM resources in the BWP. The CSI-IM resources configuration may notify the UE 1502 the CSI-IM resources that the base station 1504 may configure in the downlink BWP in the full-duplex mode and instruct the UE 1502 to measure the interference components in the configured CSI-IM resources. For example, at 1508 of FIG. 15, the UE 1502 may receive, from the base station, the configuration for one or more CSI-IM resources in the BWP. Furthermore, 1602 may be performed by a CSI-IM resources managing component 1840.

The CSI-IM resources may have patterns based on at least one of the corresponding uplink channels, a full-duplex mode, or allocation of reference signals transmitted by the UE. The CSI-IM resources may have a pattern matching an uplink reference signal. The CSI-IM resources may have a dense pattern spanning multiple resource elements in the frequency domain or multiple symbols. The CSI-IM resources may have a flexible frequency domain resource pattern in a downlink BWP of the UE, the flexible frequency domain resource pattern having a sparse allocation away from an uplink channel of the UE or an aggressor UE.

At 1604, the UE may receive a TCI state to indicate spatial receiver parameters defined by the base station. In some aspects, the base station may configure the UE to measure the CLI with certain spatial reception parameters. The UE may measure the CSI-IM resources based on the spatial receiver parameters indicated by the TCI state as defined by and received from the base station. For example, at 1510 of FIG. 15, the UE 1502 may receive, from the base station, the TCI state defined to indicate the spatial receiver parameters. Furthermore, 1604 may be performed by the CSI-IM resources managing component 1840.

At 1606, the UE may receive, from the base station, a configuration to transmit the UL reference signal concurrent with the CSI-IM resources in the time domain. The base station may also configure another UE, e.g., the aggressor UE, to transmit the UL reference signal concurrent with the CSI-IM resources in the time domain. In one aspect, the UL reference signal may be the SRS. The UE may measure at least one interference component in the CSI-IM resources based on the UL reference signal that the aggressor UE and/or the UE transmit concurrently with the CSI-IM resources in the time domain. For example, at 1511 of FIG. 15, the UE 1502 may receive the configuration to transmit the UL reference signal concurrent with the CSI-IM resources in the time domain. Furthermore, 1606 may be performed by the CSI-IM resources managing component 1840.

At 1608, the UE may transmit an uplink signal to the base station in an uplink portion of the downlink BWP based on the configuration received from the base station at 1606. The UE may measure the interference in the CSI-IM resources in the downlink BWP. In some aspects, the uplink signal may include the UL reference signal concurrent with the CSI-IM resources in the time domain, based on the configuration received at 1606 from the base station. The UE measure at least one of an RSSI, an RSRP, or an RSRQ of the interference in the CSI-IM resources in the uplink portion of the downlink BWP, based on the uplink reference signal. For example, at 1512 of FIG. 15, the UE 1502 may transmit an uplink signal to the base station in an uplink portion of the downlink BWP. Furthermore, 1608 may be performed by the CSI-IM resources managing component 1840.

At 1610, the UE may measure at least one interference component in the CSI-IM resources configured by the base station in the downlink BWP. At least one interference component in the CSI-IM resources may be caused by the interfering UL signal and/or the interference component (e.g., RSSI, RSRP, RSRQ) in the CSI-IM resources from the reference signal (e.g., SRS) in the interfering UL signal. The interference components may include the intra-cell CLI from the interfering UL signal from aggressor UE and/or the self-interference from the UL signal of the UE. In one aspect, the interfering UL signal from the aggressor UE and/or the UL signal of the UE may be the UL reference signal transmitted concurrently with the CSI-IM resources in the time domain as configured by the base station at 1604. For example, at 1514 of FIG. 15, the UE 1502 may measure at least one interference component in the CSI-IM resources configured by the base station in the downlink BWP. Furthermore, 1604 may be performed by an interference measurement component 1842.

As part of measuring the interference, the UE may measure interference components (RSSI) in the CSI-IM resources and/or interference component (RSSI, RSRP, RSRQ) from SRS, including intra-cell CLI from an interfering UL signal from aggressor UE and/or self-interference from UL signal of the UE. In some aspects, the UE may measure at least one interference component in the CSI-IM resources configured by the base station in the downlink BWP. That is, the CSI-IM resources may be measured based on spatial receiver parameters indicated by the TCI state defined by the base station at 1604. For example, The TCI state can also be configured in an aperiodic trigger state for aperiodic CLI-report. The aperiodic trigger stage may include a list of TCI states associated with the CSI-IM resource set, including multiple CSI-IM resources.

At 1612, the UE may receive a control signal for reporting the CLI report. In some aspects, generating the CLI report may be triggered by a control signal for the CLI report. The control signal may instruct the UE to generate and transmit the CLI report. The control signal for the CLI report may have various formats. The control signal may include at least one of the CSI report configurations identifying a report quantity for reporting the CLI or separate CLI report configurations for reporting the CLI. That is, the control signal for the CLI report may be configured with the report quantity of a CSI report configuration. The CSI report configuration may include report quantity, which may identify the quantities to be included in the CSI report. The base station may define and configure a new report quantity for the UE to report the CLI. The new report quantity may be, for example, CLI-RSSI, CLI-RSRP, or CLI-RSRQ, each identifying the quantities of the RSSI, RSRP, or RSRQ measurements to be included in the CLI report. In another example, the base station may define a new and separate CLI report configuration for reporting the intra-cell CLI report and the self-interference CLI report and transmit the separate CLI report configuration to the UE. For example, at 1516 of FIG. 15, the UE 1502 may receive, from the base station 1504, the control signal to instruct the UE to generate and transmit the CLI report. Furthermore, 1612 may be performed by a CLI report component 1844.

At 1614, UE may receive a threshold value for the measurement of at least one interference component in the CSI-IM resources. The UE may generate the CLI report in response to the measurement of at least one interference component in the CSI-IM resources being above the threshold value. To reduce reporting overhead, the base station may semi-statically (e.g., via RRC message) or dynamically transmit the threshold for CLI to the UE. The UE may drop the CLI report if the measured CLI falls below the threshold. In case the UE is configured to measure and report multiple CLI values for different resources, the UE may report only the measurement of the interference components (e.g., CLI-RSSI) that are above the threshold value. For example, at 1518 of FIG. 15, the UE 1502 may receive, from the base station 1504, a threshold value for the measurement of at least one interference component in the CSI-IM resources. Furthermore, 1614 may be performed by the CLI report component 1844.

At 1616, the UE may generate the CLI report based on the measurements of the interference components. For example, at 1520 of FIG. 15, the UE 1502 may generate the CLI report based on the interference components measured in the configured CSI-IM resources. Furthermore, 1612 may be performed by the CLI report component 1844.

In some aspects, the UE may determine the periodicity of the CLI report based on the control signal received from the base station at 1612. The time-domain behavior of the CLI report may depend on the periodicity of the CSI-IM resources. That is, the periodicity of the CLI report may be configured based on whether the CSI-IM resources are configured periodically, semi-persistently, or aperiodically. For example, the periodic CSI-IM may support the periodic, the semi-persistent, and the aperiodic CLI report. The semi-persistent CSI-IM may support the semi-persistent and the aperiodic CLI report. Also, the aperiodic CSI-IM may support aperiodic CLI reports.

In some aspects, the periodicity of the CLI report may also be determined based on the control signal for the CLI report. The control signal for the CLI report may be dynamically transmitted in the DCI or semi-statically transmitted in the MAC-CE. The control signal dynamically transmitted in the DCI may trigger the aperiodic CLI-report or the semi-persistent CLI-report, and the aperiodic CLI-report and the semi-persistent CLI-report activated by the DCI may be transmitted on the PUSCH. The control signal semi-statically transmitted in the MAC-CE may trigger the semi-persistent CLI-report, and the semi-persistent CLI-report activated by the MAC-CE may be transmitted on the PUCCH.

In one aspect, the UE 1502 may determine the granularities of the CLI reports. For example, different frequency granularities for interference reporting can be configured, e.g., wideband reporting and sub-band reporting. In another aspect, for sub-band reporting, the UE 1502 may report an average of measured interference components (e.g., RSSI, RSRP, or RSRQ) and delta values for each of the sub-bands or report the measured interference components (e.g., RSSI, RSRP, or RSRQ) value for each sub-band. In another aspect, the CLI report may also be associated with multiple CSI-IM resource sets for CLI reporting from different nearby UEs.

In some aspects, the CLI report may have various timeline requirements. The control signal for the CLI report received at 1516 may include the timeline requirement of the CLI report. In one aspect, the timeline requirement of the CLI report may follow the CSI reporting timeline requirement. That is, a wideband CLI report may follow the low latency class, and the sub-band CLI report may follow the high latency class. In another example, the base station 1504 may define a separate timeline requirement for the CLI reports. In another aspect, the timeline requirement of the CLI report may be configured differently than the timeline requirement of the CSI reporting timeline requirement. That is, the processing time required for the UE 1502 to process the CLI report may be configured shorter than the CSI report. For example, the UE 1502 may only be measuring the RSSI, RSRP, and/or RSRQ, and the time required for the UE 1502 to generate and send the CLI report may be configured shorter than the CSI report.

The CLI report from the UE 1502 may be sent to the base station 1504 on the PUSCH or the PUCCH. The base station 1504 may limit the number of CLI reports to be sent on the payload of the PUCCH to a number of bits. The size of the payload of the CLI report may be limited to a threshold size. That is, the size of the payload of the CLI report may be limited to the first number of bits. In one aspect, the CLI report may include a wideband CLI report transmitted on a PUCCH, and the size of the CLI report may be limited to the first number of bits. In another aspect, the CLI report limited to the first number of bits may include a wideband CLI report and a maximum number of sub-band CLI reports. Accordingly, depending on the payload size, we may transmit only the wideband CLI on the PUCCH or report the wideband CLI measurement with a maximum number of sub-band CLI measurements permissible within the limited number of bits allocated on the PUCCH.

In some aspects, the CLI measurement to be sent on PUSCH may be ordered by their priority. That is, the CLI measurements to be included in the CLI report may be prioritized, and the UE 1502 may order the CLI measurements to be transmitted to the base station 1504 on the PUSCH based on the priority of the CLI measurements. For example, the wideband CLI measurement may be transmitted, followed by the sub-band CLI measurements, since the wideband CLI measurement has a higher priority. In case there are multiple sub-band CLI measurements, the multiple sub-band CLI measurements may be ordered by their priority and/or value. The sub-band CLI measurement with low priority and/or value may be dropped based on resources available in the PUSCH to transmit the generated CLI reports. That is, the UE may determine that the resources available in the PUSCH may not be enough to transmit all of the generated multiple sub-band CLI measurements, and the UE may determine to drop at least one of multiple sub-band CLI measurements that has low priority and/or value.

At 1618, the UE may drop at least one CLI report with a low priority based on resources available in the PUSCH to transmit the generated CLI reports. In some aspects, two or more CLI reports may be scheduled to be transmitted simultaneously, and the UE may determine to transmit the CLI report with a high priority based on determining that the available resources are not enough to send all of the generated CLI reports. For example, the reports may be prioritized according to their time-domain behavior and content. For example, at 1522 of FIG. 15, the UE 1502 may drop at least one CLI report with a low priority based on resources available in the PUSCH to transmit the generated CLI reports. Furthermore, 1614 may be performed by the CLI report component 1844.

At 1620, the UE may transmit the CLI report to the base station. That is, the UE may transmit the CLI report that was generated at 1616 and not dropped at 1618. The CLI report may be transmitted on the PUSCH or the PUCCH. For example, at 1524 of FIG. 15, the UE 1502 may transmit the generated CLI report to the base station 1504. Furthermore, 1614 may be performed by the CLI report component 1844.

Figure 17B:
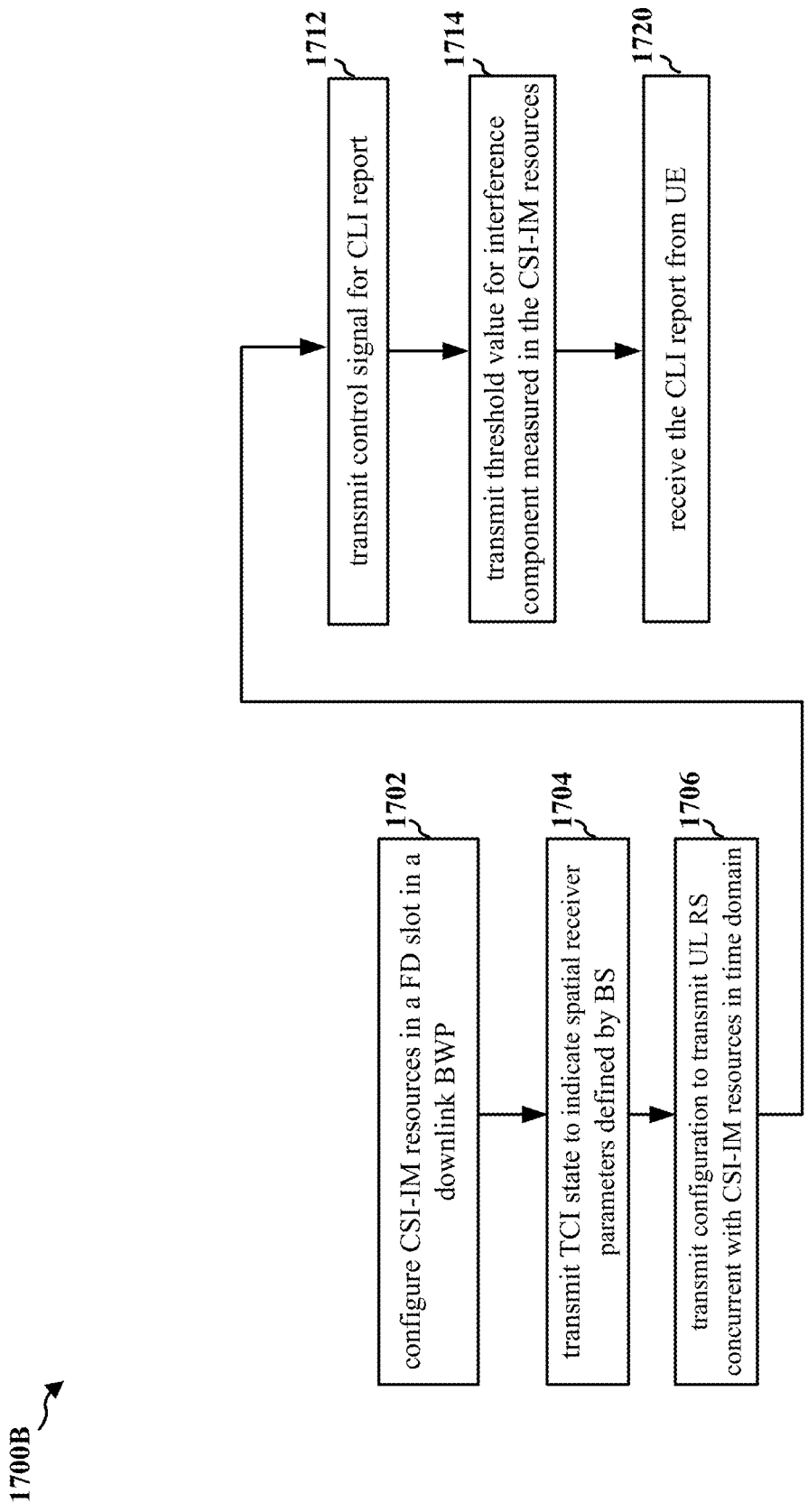

FIGS. 17A and 17B are flowcharts 1700A and 1700B of a method of wireless communication. The method may be performed by a base station in a full-duplex mode (e.g., the base station 102/180/702/712/1504; the apparatus 1902). The base station may configure the UE with CSI-IM resources for measuring intra-cell interferences or self-interferences in full-duplex communication and receive the CLI report from the UE.

At 1702, the base station may configure the CSI-IM resources in a full-duplex slot in a downlink BWP. In some aspects, the base station may determine the CSI-IM resource patterns. Referring again to FIG. 13, the base station may configure patterns for CSI-IM resources to enable accurate CLI measurement and reporting based on a full-duplex mode, and/or allocation of the reference signals transmitted by the UE and/or corresponding channels. In one aspect, the CSI-IM resources pattern, e.g., the CSI-IM resource pattern 2 1306 of FIG. 13, may have a dense pattern in the frequency domain which can be used to measure interference in the UL portion of the full-duplex slot. In another aspect, the CSI-IM resources pattern, e.g., the CSI-IM resource pattern 3 1308 of FIG. 13, may have a pattern further spanning multiple symbols. In another aspect, the CSI-IM resources pattern, e.g., the CSI-IM resource pattern 4 1310 of FIG. 13, may be provided to match the SRS patterns, e.g., the SRS patterns illustrated in FIG. 10. In another aspect, the CSI-IM resource pattern, e.g., the CSI-IM resource pattern 5 1312, may have a flexible frequency domain resource configuration for CSI-IM to enable sparse allocation away from UL as leakage from CLI decreases.

In some aspects, the base station may transmit a configuration for one or more CSI-IM resources in a BWP to the UE 1502. The CSI-IM resources configuration may notify the UE of the CSI-IM resources that the base station may configure in the downlink BWP in the full-duplex mode and instruct the UE to measure the interference components in the configured CSI-IM resources. In one aspect, the base station may configure the UE to measure the CLI with certain spatial reception parameters. At 1510, the base station may define a TCI state to indicate spatial receiver parameters, and the UE may be configured to measure the CSI-IM resources based on the spatial receiver parameters, e.g., QCL-TypeD, and signal the TCI state to the UE 1502. The UE may receive, from the base station 1504, the TCI state defined to indicate the spatial receiver parameters, and the UE may be configured to measure the CSI-IM resources based on the spatial receiver parameters. The TCI state may be signaled to the UE in a similar manner to transmitting the configuration for one or more CSI-IM resources at 1508. For example, at 1506 and 1508 of FIG. 15, the base station 1504 may determine the CSI-IM resource patterns and transmit the configuration for one or more CSI-IM resources in a BWP to the UE 1502. Furthermore, 1702 may be performed by a CSI-IM resources managing component 1940.

At 1704, the base station may define and transmit the TCI state to indicate spatial receiver parameters to the UE. In some aspects, the base station may configure the UE to measure the CLI with certain spatial reception parameters. The UE may measure the CSI-IM resources based on the spatial receiver parameters indicated by the TCI state as defined by and received from the base station. For example, at 1510 of FIG. 15, the base station 1504 may define a TCI state to indicate spatial receiver parameters. Furthermore, 1704 may be performed by the CSI-IM resources managing component 1940.

At 1706, the base station may transmit, to the UE, a configuration to transmit the UL reference signal concurrent with the CSI-IM resources in the time domain. The base station may also configure another UE, e.g., the aggressor UE, to transmit the UL reference signal concurrent with the CSI-IM resources in the time domain. In one aspect, the UL reference signal may be the SRS. The UE may measure at least one interference component in the CSI-IM resources based on the UL reference signal that the aggressor UE and/or the UE transmit concurrently with the CSI-IM resources in the time domain. For example, at 1511 of FIG. 15, the base station 1504 may configure the UE 1502 to measure the CLI with certain spatial reception parameters. Furthermore, 1706 may be performed by the CSI-IM resources managing component 1940.

At 1712, the base station may transmit, to the UE, a control signal to instruct the UE to generate and transmit the CLI report. That is, the base station may transmit the control signal and trigger the UE to generate the CLI report. The control signal may include at least one of the CSI report configurations identifying a report quantity for reporting the CLI or separate CLI report configurations for reporting the CLI. The control signal for the CLI report may have various formats. The control signal may include at least one of the CSI report configurations identifying a report quantity for reporting the CLI or separate CLI report configurations for reporting the CLI. That is, the control signal for the CLI report may be configured with the report quantity of a CSI report configuration. The CSI report configuration may include report quantity, which may identify the quantities to be included in the CSI report. The base station may define and configure a new report quantity for the UE to report the CLI. The new report quantity may be, for example, CLI-RSSI, CLI-RSRP, or CLI-RSRQ, each identifying the quantities of the RSSI, RSRP, or RSRQ measurements to be included in the CLI report. In another example, the base station may define a new and separate CLI report configuration for reporting the intra-cell CLI report and the self-interference CLI report and transmit the separate CLI report configuration to the UE.

The base station may configure the UE to generate the CLI report periodically, semi-persistently, or aperiodically based on a periodicity of the CSI-IM resources and the periodicity of the CSI-IM may be determined by the configuration of the CSI-IM resources. The control signal for the CLI report may be dynamically transmitted in the DCI or semi-statically transmitted in the MAC-CE. The control signal dynamically transmitted in the DCI may trigger the aperiodic CLI-report or the semi-persistent CLI-report, and the aperiodic CLI-report and the semi-persistent CLI-report activated by the DCI may be transmitted on the PUSCH. The control signal semi-statically transmitted in the MAC-CE may trigger the semi-persistent CLI-report, and the semi-persistent CLI-report activated by the MAC-CE may be transmitted on the PUCCH. For example, at 1516 of FIG. 15, the base station 1504 may transmit, to the UE 1502, the control signal to instruct the UE to generate and transmit the CLI report. Furthermore, 1712 may be performed by a CLI report component 1942.

At 1714, the base station may transmit a threshold value for the measurement of at least one interference component in the CSI-IM resources. The UE may generate the CLI report in response to the measurement of at least one interference component in the CSI-IM resources being above the threshold value. To reduce reporting overhead, the base station may semi-statically (e.g., via RRC message) or dynamically transmit the threshold for the UE to determine whether to transmit the CLI report. In one example, the UE may drop the CLI report if the measured CLI falls below the threshold. In another example, the UE may be configured to measure and report multiple CLI values for different resources, and the UE may report the measurement of the interference components (e.g., CLI-RSSI) that are above the threshold value. For example, at 1518 of FIG. 15, the base station 1504 may transmit, to the UE 1502, the threshold value for the measurement of at least one interference component in the CSI-IM resources. Furthermore, 1714 may be performed by the CLI report component 1942.

At 1720, the base station may receive the generated CLI report from the UE. For example, at 1524 of FIG. 15, the base station 1504 may receive the CLI report generated by the UE 1502. Furthermore, 1720 may be performed by the CLI report component 1942.

Figure 18:
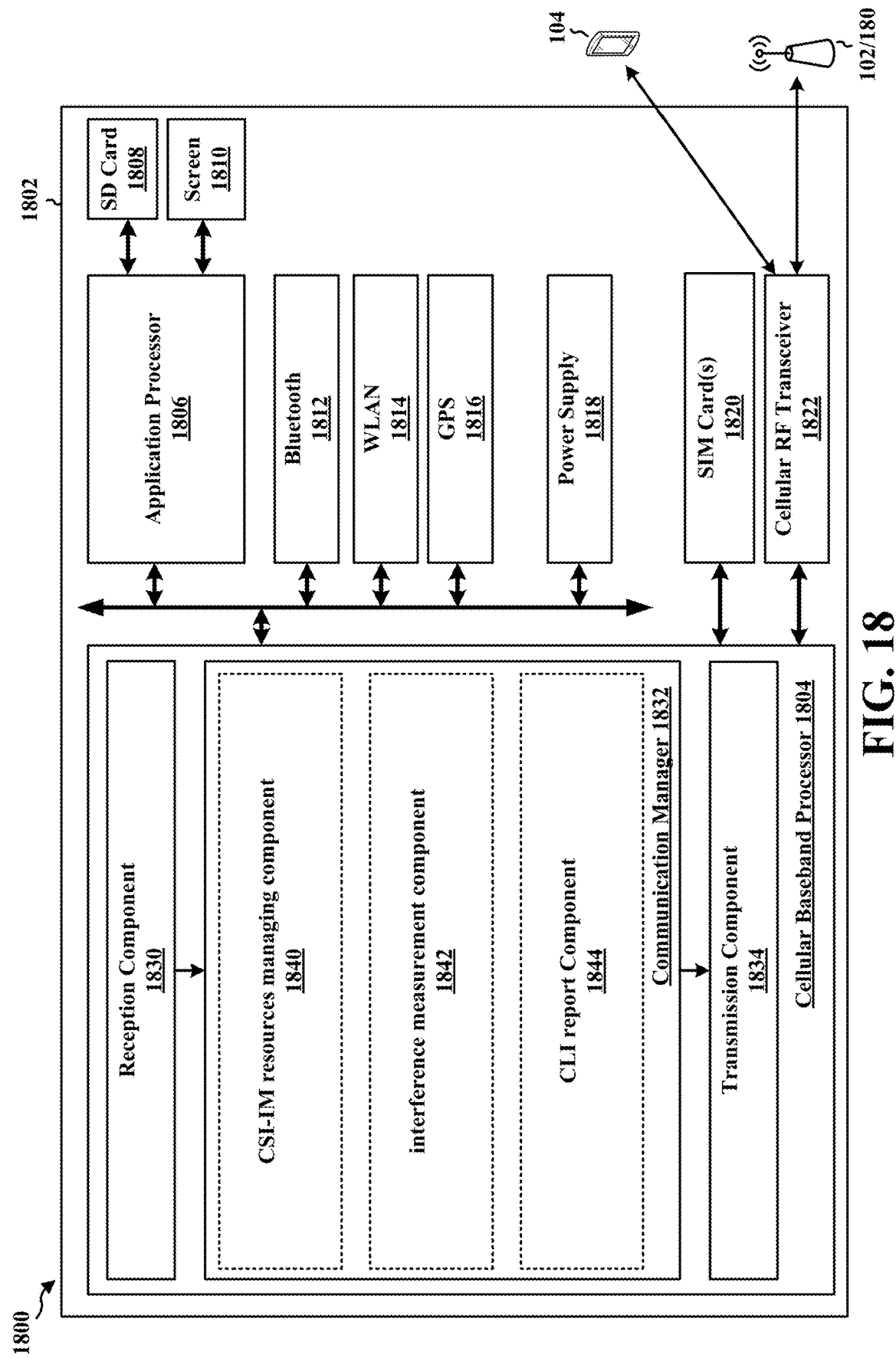
FIG. 18 is a diagram illustrating an example of a hardware implementation for an example apparatus.

FIG. 18 is a diagram 1800 illustrating an example of a hardware implementation for an apparatus 1802. The apparatus 1802 is a UE and includes a cellular baseband processor 1804 (also referred to as a modem) coupled to a cellular RF transceiver 1822 and one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, and a power supply 1818. The cellular baseband processor 1804 communicates through the cellular RF transceiver 1822 with the UE 104 and/or base station 102/180. The cellular baseband processor 1804 may include a computer-readable medium/memory. The computer-readable medium/memory may be non-transitory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the cellular baseband processor 1804. The cellular baseband processor 1804 may be a component of the UE 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802.

The communication manager 1832 includes a CSI-IM resources managing component 1840 that is configured to receive a configuration for one or more CSI-IM resources in the BWP, receive TCI state to indicate spatial receiver parameters defined by the base station, receive a configuration to transmit the UL reference signal concurrent with the CSI-IM resources in the time domain, and transmit an uplink signal to the base station in an uplink portion of the downlink BWP, e.g., as described in connection with 1602, 1604, 1606, and 1608. The communication manager 1832 further includes an interference measurement component 1842 that is configured to measure at least one interference component in the CSI-IM resources configured by the base station in the downlink BWP, e.g., as described in connection with 1610. The communication manager 1832 further includes a CLI report component 1844 that is configured to receive a control signal for reporting the CLI report, receive a threshold value for measurement of the at least one interference component in the CSI-IM resources, may generate the CLI report based on the measurements of the interference components, drop at least one CLI report with a low priority based on resources available in the PUSCH to transmit the generated CLI reports, and transmit the CLI report to the base station, e.g., as described in connection with 1612, 1614, 1616, 1618, and 1620.

The apparatus may include additional components that perform each of the blocks of the algorithm in the flowcharts of FIGS. 15, 16A, and 16B. As such, each block in the flowcharts of FIGS. 15, 16A, and 16B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the cellular baseband processor 1804, includes means for receiving, from a base station, a configuration for one or more CSI-IM resources in a BWP, means for measuring at least one interference component in the CSI-IM resources configured by the base station in the downlink BWP, means for generating a CLI report including measurement of the at least one interference component, and means for transmitting the generated CLI report to the base station. The apparatus 1802 includes means for transmitting an uplink signal to the base station in an uplink portion of the downlink BWP, means for receiving, from the base station, a control signal for reporting the CLI, means for receiving a threshold value for measurement of the at least one interference component in the CSI-IM resources, and means for dropping at least one CLI report with low priorities based on resources available in the PUSCH to transmit the generated CLI reports. The means may be one or more of the components of the apparatus 1802 configured to perform the functions recited by the means. As described supra, the apparatus 1802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 19:
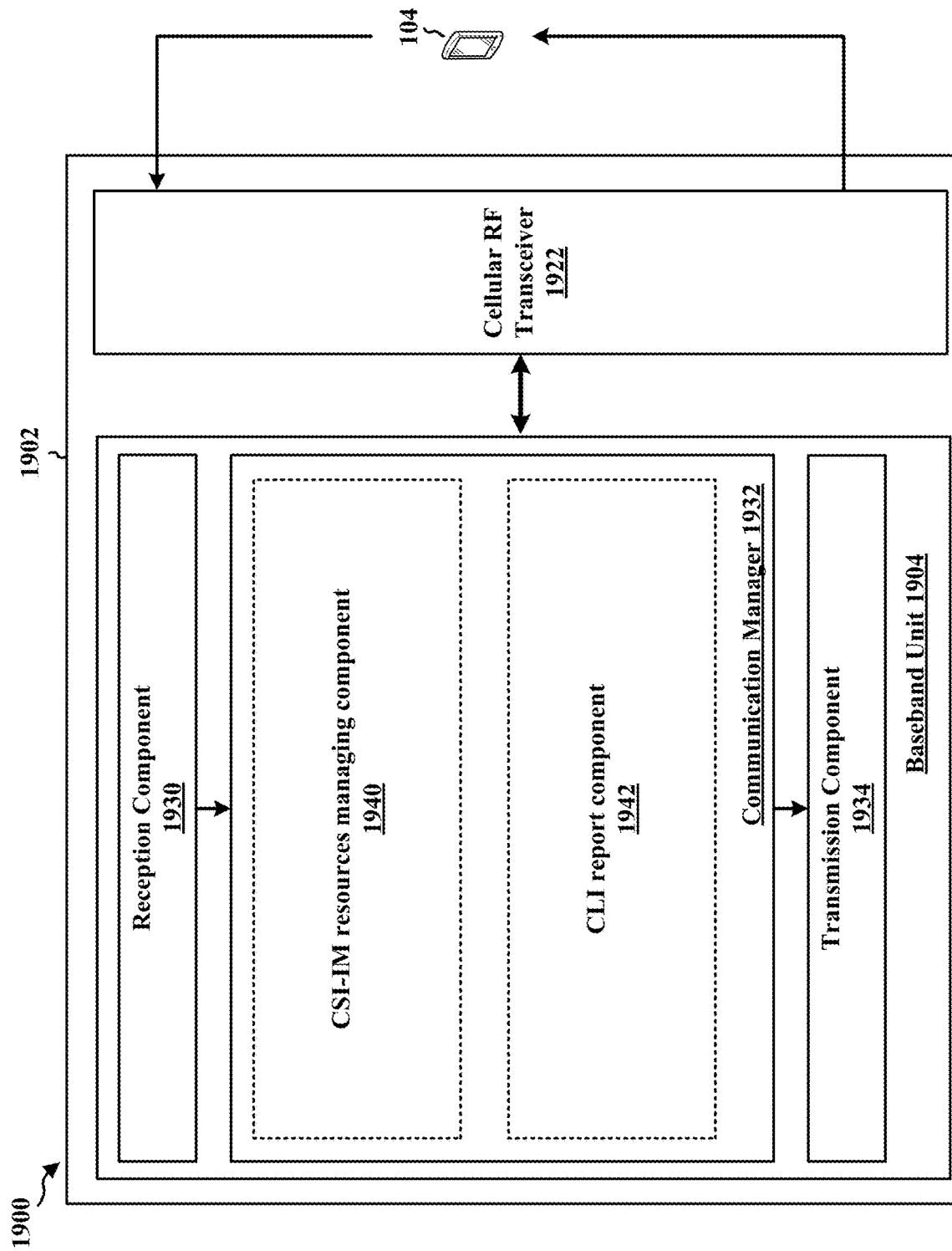
FIG. 19 is a diagram illustrating an example of a hardware implementation for an example apparatus.

FIG. 19 is a diagram 1900 illustrating an example of a hardware implementation for an apparatus 1902. The apparatus 1902 is a base station and includes a baseband unit 1904. The baseband unit 1904 may communicate through a cellular RF transceiver 1922 with the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the base station 310 and may include the memory 376 and/or at least one of the TX processor 316, the RX processor 370, and the controller/processor 375.

The communication manager 1932 includes a CSI-IM resources managing component 1940 that is configured to configure the CSI-IM resources in a full-duplex slot in a downlink BWP, define and transmit TCI state to indicate spatial receiver parameters to the UE, and transmit a configuration to transmit the UL reference signal concurrent with the CSI-IM resources in the time domain, e.g., as described in connection with 1702, 1704, and 1706. The communication manager 1932 further includes a CLI report component 1942 that is configured to transmit a control signal to instruct the UE to generate and transmit the CLI report, transmit a threshold value for the measurement of the at least one interference component in the CSI-IM resources, and receive the generated CLI report from the UE, e.g., as described in connection with 1712, 1714, and 1720.

The apparatus may include additional components that perform each of the blocks of the algorithm in the flowcharts of FIGS. 15, 17A, and 17B. As such, each block in the flowcharts of FIGS. 15, 17A, and 17B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the baseband unit 1904, includes means for configuring CSI-IM resources in a full-duplex slot in a downlink BWP, and means for receiving, from a first UE, a CLI report including at least one component of interference including a measurement of an interference in the CSI-IM resources based on an uplink signal transmitted to the base station. The apparatus 1902 includes means for determining CSI-IM resource patterns based on at least one of corresponding uplink channels, a full-duplex mode, or allocation of reference signals transmitted by the UE, means for transmitting, to the UE, a control signal to instruct the UE to generate and transmit the CLI report, the control signal including at least one of CSI report configurations identifying a report quantity for reporting the CLI, or separate CLI report configurations for reporting the CLI, and means for configuring the UE to generate the CLI report periodically, semi-persistently, or aperiodically based on a periodicity of the CSI-IM resources. The apparatus 1902 includes means for transmitting a threshold value to instruct the UE to generate the CLI report in response to the measurement of the at least one interference component in the CSI-IM resources being above the threshold value, and means for defining a TCI state to indicate spatial receiver parameters, the UE being configured to measure the CSI-IM resources based on the spatial receiver parameters. The means may be one or more of the components of the apparatus 1902 configured to perform the functions recited by the means. As described supra, the apparatus 1902 may include the TX Processor 316, the RX Processor 370, and the controller/processor 375. As such, in one configuration, the means may be the TX Processor 316, the RX Processor 370, and the controller/processor 375 configured to perform the functions recited by the means.

The method and apparatus of wireless communication may be configured to report intra-cell CLI and self-interference in a full duplex communication. A base station may configure CSI-IM resources in a DL BWP of a full-duplex slot. A UE may measure interference components in the CSI-IM resources and generate and/or transmit a CLI report including the measurement of the interference components to the base station. The measurement of interference components may include a RSSI measurement of intra-cell CLI from an interfering uplink signal transmitted from an aggressor UE or a self-interference from an uplink channel of the UE. The uplink signal may be an SRS, and the CLI report may include the RSSI, an RSRP, and/or an RSRQ of the interference in the CSI-IM resources in the uplink channel. The CSI-IM resources and the CLI report may have various configurations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE in a full-duplex mode, including receiving, from a base station, a configuration for one or more CSI-IM resources in a BWP, measuring at least one interference component of the CSI-IM resources in the downlink BWP, generating a CLI report including measurement of the at least one interference component, and transmitting the CLI report to the base station.

Aspect 2 is the method of aspect 1, where the measuring of the at least one interference component includes a measurement of an interference in the CSI-IM resources in the downlink BWP, wherein the interference is generated by an interfering uplink signal transmitted from an aggressor UE via an interfering uplink channel.

Aspect 3 is the method of aspect 2, where the measurement of the interference includes measuring an RSSI of the interference in the CSI-IM resources in the downlink BWP.

Aspect 4 is the method of any of aspects 2 and 3, where the interfering uplink signal includes an interfering uplink reference signal transmitted from the aggressor UE, the interfering uplink reference signal configured concurrent with the CSI-IM in time domain.

Aspect 5 is the method of aspect 4, where the measuring the interference includes measuring at least one of an RSSI, an RSRP, or an RSRQ of the interference in the CSI-IM resources overlapping the interfering uplink channel from the aggressor UE.

Aspect 6 is the method of any of aspects 1 to 5, further including transmitting an uplink signal to the base station in an uplink portion of the downlink BWP, where the measuring of the at least one interference component includes measuring an RSSI of the interference in the CSI-IM resources in the downlink BWP.

Aspect 7 is thod of aspect 6, where the uplink signal includes an uplink reference signal, the uplink reference signal of the UE configured concurrent with the CSI-IM resources of the downlink channel of the base station in time domain, and the measuring of the at least one interference component includes measuring at least one of an RSSI, an RSRP, or an RSRQ of the interference in the CSI-IM resources in the uplink portion of the downlink BWP, based on the uplink reference signal.

Aspect 8 is the method of any of aspects 1 to 7, where the CSI-IM resources have patterns based on at least one of corresponding uplink channels, a full-duplex mode, or allocation of reference signals transmitted by the UE.

Aspect 9 is the method of aspect 8, where the CSI-IM resources have a pattern matching an uplink reference signal.

Aspect 10 is the method of aspect 8, where the CSI-IM resources have a dense pattern spanning multiple Resource elements in frequency domain or multiple symbols.

Aspect 11 is the method of aspect 8, where the CSI-IM resources have a flexible frequency domain resource pattern in a downlink BWP of the UE, the flexible frequency domain resource pattern having a sparse allocation away from an uplink channel of the UE or an aggressor UE.

Aspect 12 is the method of any of aspects 1 to 11, further including receiving, from the base station, a control signal for reporting the CLI, the control signal including at least one of CSI report configurations identifying a report quantity for reporting the CLI, or separate CLI report configurations for reporting the CLI, and the CLI report is generated based on the control signal received from the base station.

Aspect 13 is the method of aspect 12, where the CLI report is generated periodically, semi-persistently, or aperiodically based on a periodic CSI-IM, the CLI report is generated semi-persistently or aperiodically based on a semi-persistent CSI-IM, and the CLI report is generated aperiodically based on an aperiodic CSI-IM.

Aspect 14 is the method of aspect 13, where the control signal received in a DCI triggers transmission of one of the aperiodic CLI report or the semi-persistent CLI report on a PUSCH, and the control signal received in a MAC-CE triggers transmission of the semi-persistent CLI report on a PUCCH.

Aspect 15 is the method of any of aspects 1 to 14, where the CLI report has different frequency granularities for reporting wideband or one or more sub-bands measurements.

Aspect 16 is the method of aspect 15, where the CLI report includes an average value of the measured interference in CSI-IM resources and delta values for each of the sub-bands.

Aspect 17 is the method of aspect 15, where the CLI report includes measured values of the at least one interference component in CSI-IM resources for each of the sub-bands.

Aspect 18 is the method of any of aspects 1 to 17, further including receiving a threshold value for measurement of the at least one interference component in the CSI-IM resources, and the CLI report is generated in response to the measurement of the at least one interference component in the CSI-IM resources being above the threshold value.

Aspect 19 is the method of aspect 18, where the measurement of the CSI-IM resources includes an RSSI, an RSRP, or an RSRQ measurement of the CSI-IM resources, and where the UE is configured to generate or report the CLI report in response the RSSI, RSRP, or RSRQ measurement of the CSI-IM resources is above a threshold RSSI, RSRP, or RSRQ value.

Aspect 20 is the method of any of aspects 1 to 19, where the CSI-IM resources are measured based on spatial receiver parameters indicated by a TCI state defined by the base station.

Aspect 21 is the method of any of aspects 1 to 20, where the CLI report includes at least one of a wideband CLI report following CSI report low latency class time requirement, or a sub-band CLI report following CSI report high latency class time requirement.

Aspect 22 is the method of any of aspects 1 to 21, where a timeline requirement of the CLI report is configured differently than a timeline requirement of a CSI report.

Aspect 23 is the method of any of aspects 1 to 22, where the CLI report including a wideband CLI report is limited to a first number of bits, and the CLI report limited to the first number of bits may further include a maximum number of sub-band CLI reports.

Aspect 24 is the method of any of aspects 1 to 23, where an order of the CLI reports transmitted on a PUSCH is based on priorities of the CLI reports, the priorities of the CLI reports being determined based on time domain behavior and content of each of the CLI reports.

Aspect 25 is the method of aspect 24, further including dropping the CLI reports with low priorities based on resources available in the PUSCH to transmit the generated CLI reports.

Aspect 26 is the method of any of aspects 1 to 25, where the CLI reports includes two or more CLI reports scheduled to be transmitted concurrently, and the method further includes dropping at least one CLI report with lower priority based on resources available in the PUSCH to transmit the generated CLI reports, the priorities of the CLI reports being determined based on time domain behavior and content of each of the CLI reports.

Aspect 27 is an apparatus for wireless communication including at least one processor coupled to a memory and configured to implement a method as in any of aspects 1 to 26.

Aspect 28 is an apparatus for wireless communication including means for implementing a method as in any of aspects 1 to 26.

Aspect 29 is a computer-readable medium storing computer executable code, where the code when executed by a processor causes the processor to implement a method as in any of aspects 1 to 26.

Aspect 30 is a method of wireless communication at a base station in a full-duplex mode, the method including configuring CSI-IM resources in a full-duplex slot in a downlink BWP, and receiving, from a first UE, a CLI report including at least one interference component including a measurement of an interference in the CSI-IM resources based on an uplink signal transmitted to the base station.

Aspect 31 is the method of aspect 30, where the measurement of the interference in the CSI-IM resources includes a measurement of an RSSI of the interference in the CSI-IM resources in the downlink BWP.

Aspect 32 is the method of any of aspects 30 and 31, where the measurement of the uplink signal transmitted to the base station includes at least one of an interfering uplink signal transmitted from a second UE via an interfering uplink channel in the downlink BWP, or an uplink signal transmitted from the first UE via an uplink channel in the downlink BWP.

Aspect 33 is the method of aspect 32, where the configuring CSI-IM resources includes configuring at least one of the first UE or the second UE to transmit an uplink reference signal concurrent with the CSI-IM in time domain.

Aspect 34 is the method of aspect 33, where the measurement of the interference in the CSI-IM resources includes measurement of at least one of an RSSI, an RSRP, or an RSRQ of the interference in the CSI-IM resources overlapping the uplink reference signal transmitted to the base station.

Aspect 35 is the method of any of aspects 30 to 34, further including determining CSI-IM resource patterns based on at least one of corresponding uplink channels, a full-duplex mode, or allocation of reference signals transmitted by the UE, where the CSI-IM resources are configured based on the determine CSI-IM resource patterns.

Aspect 36 is the method of aspect 35, where the CSI-IM resources have a pattern matching an uplink reference signal.

Aspect 37 is the method of any of aspects 35 and 36, where the CSI-IM resources have a dense pattern spanning multiple Resource elements in frequency domain or multiple symbols.

Aspect 38 is the method of any of aspects 35 to 37, where the CSI-IM resources have a flexible frequency domain resource pattern in a downlink BWP of the UE, the flexible frequency domain resource pattern having a sparse allocation away from an uplink channel of the UE or an aggressor UE.

Aspect 39 is the method of any of aspects 30 to 38, further including transmitting, to the UE, a control signal to instruct the UE to generate and transmit the CLI report, the control signal including at least one of CSI report configurations identifying a report quantity for reporting the CLI, or separate CLI report configurations for reporting the CLI.

Aspect 40 is the method of aspect 39, further including configuring the UE to generate the CLI report periodically, semi-persistently, or aperiodically based on a periodicity of the CSI-IM resources, where the periodicity of the CSI-IM determined by the configuration of the CSI-IM resources.

Aspect 41 is the method of aspect 40, where the control signal transmitted in a DCI to the UE, and the CLI report is received on one of the aperiodic CLI report or the semi-persistent CLI report on a PUSCH.

Aspect 42 is the method of any of aspects 40 and 41, where the control signal transmitted in a MAC-CE to the UE, and the CLI report is received on the semi-persistent CLI report on a PUCCH.

Aspect 43 is the method of any of aspects 30 to 42, where the CLI report has different frequency granularities for reporting wideband or one or more sub-bands measurements.

Aspect 44 is the method of aspect 43, where the CLI report includes an average value of the measured interference in CSI-IM resources and delta values for each of the sub-bands.

Aspect 45 is the method of any of aspects 43 and 44, where the CLI report includes measured values of the at least one interference component in CSI-IM resources for each of the sub-bands.

Aspect 46 is the method of any of aspects 30 to 45, further including transmitting a threshold value to instruct the UE to generate the CLI report in response to the measurement of the at least one interference component in the CSI-IM resources being above the threshold value.

Aspect 47 is the method of any of aspects 30 to 46, further including defining a TCI state to indicate spatial receiver parameters, the UE being configured to measure the CSI-IM resources based on the spatial receiver parameters.

Aspect 48 is the method of any of aspects 30 to 47, where the CLI report includes at least one of a wideband CLI report following CSI report low latency class time requirement, or a sub-band CLI report following CSI report high latency class time requirement.

Aspect 49 is the method of any of aspects 30 to 48, where a timeline requirement of the CLI report is configured differently than a timeline requirement of a CSI report.

Aspect 50 is an apparatus for wireless communication including at least one processor coupled to a memory and configured to implement a method as in any of aspects 30 to 49.

Aspect 51 is an apparatus for wireless communication including means for implementing a method as in any of aspects 30 to 49.

Aspect 52 is a computer-readable medium storing computer executable code, where the code when executed by a processor causes the processor to implement a method as in any of aspects 30 to 49.

What is claimed is:

1. A user equipment (UE) for wireless communication comprising:
   memory; and
   at least one processor coupled to the memory, wherein the UE is configured to:
   receive, from a network, a configuration for one or more channel state information (CSI) interference measurement (IM) (CSI-IM) resources in a downlink bandwidth part (BWP) for measurement of inter-cell interference, wherein the CSI-IM resources span an uplink portion and a downlink portion of full-duplex resources in the downlink BWP, and wherein the CSI-IM resources include a first pattern associated with a half-duplex mode and a second pattern associated with a full-duplex mode;
   measure at least one interference component of the CSI-IM resources in the downlink BWP, wherein the at least one interference component comprises interference associated with an intra-cell interfering uplink signal; and
   transmit a cross-link interference (CLI) report to the network, wherein the CLI report is based on the measurement of the at least one interference component.

2. The UE of claim 1, wherein the intra-cell interfering uplink signal comprises an interfering uplink reference signal from an aggressor UE, the intra-cell interfering uplink reference signal configured concurrent with the CSI-IM in time domain.

3. The UE of claim 1, wherein the UE is configured to:
   transmit an uplink signal in the uplink portion of the downlink BWP concurrent with the CSI-IM resources of the downlink channel in time domain, the measurement of the at least one interference component including the interference including self-interference associated with the uplink signal.

4. The UE of claim 1, wherein the CSI-IM resources have patterns based on corresponding uplink channels.

5. The UE of claim 1, wherein the CSI-IM resources have a pattern matching an uplink reference signal.

6. The UE of claim 1, wherein the CSI-IM resources have a dense pattern spanning multiple Resource elements in frequency domain or multiple symbols.

7. The UE of claim 1, wherein the CSI-IM resources have a flexible frequency domain resource pattern in a downlink BWP of the UE, the flexible frequency domain resource pattern having a sparse allocation away from an uplink channel of the UE or an aggressor UE.

8. The UE of claim 1, wherein the UE is configured to:
   receive, from the network, a control signal, the control signal comprising at least one of CSI report configurations identifying a report quantity for reporting the CLI, or separate CLI report configurations for reporting the CLI, and
   wherein the CLI report is based on the control signal received from the network.

9. The UE of claim 8, wherein the UE is configured to transmit the CLI report periodically, semi-persistently, or aperiodically based on a periodic CSI-IM,
   transmit the CLI report semi-persistently or aperiodically based on a semi-persistent CSI-IM, or
   transmit the CLI report aperiodically based on an aperiodic CSI-IM.

10. The UE of claim 9, wherein the control signal is configured to trigger a transmission of one of the aperiodic CLI report or the semi-persistent CLI report on a physical uplink shared channel (PUSCH), or wherein the control signal is configured to trigger the transmission of the semi-persistent CLI report on a physical uplink control channel (PUCCH).

11. The UE of claim 1, wherein the CLI report has different frequency granularities for reporting wideband or one or more sub-bands measurements.

12. The UE of claim 11, wherein the CLI report comprises: an average value of the measured interference in CSI-IM resources and delta values for each of the sub-bands.

13. The UE of claim 11, wherein the CLI report comprises: measured values of the at least one interference component in CSI-IM resources for each of the sub-bands.

14. The UE of claim 1, wherein the UE is configured to:
   receive a threshold value for the measurement of the at least one interference component in the CSI-IM resources, and
   generate the CLI report in response to the measurement of the at least one interference component in the CSI-IM resources being above the threshold value.

15. The UE of claim 1, wherein the CSI-IM resources are measured based on spatial receiver parameters indicated by a transmission configuration indicator (TCI) state defined by the network.

16. The UE of claim 1, wherein the CLI report comprises at least one of a wideband CLI report following CSI report low latency class timeline; or a sub-band CLI report following CSI report high latency class timeline.

17. The UE of claim 1, wherein a first timeline of the CLI report is configured differently than a second timeline of a CSI report.

18. The UE of claim 1, wherein an order of one or more CLI reports on a physical uplink shared channel (PUSCH) comprising the CLI report is based on respective priorities of the one or more CLI reports, the respective priorities of the one or more CLI reports being based on respective time domain behavior and respective content of each of the one or more CLI reports.

19. The UE of claim 18, wherein the UE is configured to drop the CLI reports with low priorities based on resources available in the PUSCH to transmit the one or more CLI reports.

20. The UE of claim 1, wherein the CLI report is scheduled to be transmitted concurrently with a second CLI report, and the UE is configured to drop at least one of the CLI report and the second CLI report with lower priority based on resources available in a physical uplink shared channel (PUSCH) to transmit the CLI report and the second CLI reports, the respective priorities of the CLI report and the second CLI report being based on respective time domain behavior and respective content of the CLI report and the second CLI report.

21. The UE of claim 1, further comprising a transceiver coupled to the at least one processor.

22. A method of wireless communication performed by a user equipment (UE), comprising:
receiving, from a network, a configuration for one or more channel state information (CSI) interference measurement (IM) (CSI-IM) resources in a downlink bandwidth part (BWP) for measurement of inter-cell interference, wherein the CSI-IM resources span an uplink portion and a downlink portion of full-duplex resources in the downlink BWP, and wherein the CSI-IM resources include a first pattern associated with a half-duplex mode and a second pattern associated with a full-duplex mode;
measuring at least one interference component of the CSI-IM resources in the downlink BWP, wherein the at least one interference component comprises interference associated with an intra-cell interfering uplink signal; and
transmitting cross-link interference (CLI) report to the network, wherein the CLI report is based on the measurement of the of the at least one interference component.

23. The method of claim 22, further comprising:
transmitting an uplink signal in the uplink portion of the downlink BWP concurrent with the CSI-IM resources of the downlink channel in time domain, the measurement of the at least one interference component including the interference including self-interference associated with the uplink signal.

24. The method of claim 22, wherein the CSI-IM resources have patterns based on corresponding uplink channels.

25. The method of claim 23, further comprising:
receiving, from the network, a control signal, the control signal comprising at least one of CSI report configurations identifying a report quantity for reporting the CLI, or separate CLI report configurations for reporting the CLI, and
wherein the CLI report is based on the control signal received from the network.

26. The method of claim 22, further comprising:
receiving a threshold value for the measurement of the at least one interference component in the CSI-IM resources, and
generating the CLI report in response to the measurement of the at least one interference component in the CSI-IM resources being above the threshold value.

27. An apparatus for wireless communication, comprising:
means for receiving, from a network, a configuration for one or more channel state information (CSI) interference measurement (IM) (CSI-IM) resources in a downlink bandwidth part (BWP) for measurement of inter-cell interference, wherein the CSI-IM resources span an uplink portion and a downlink portion of full-duplex resources in the downlink BWP, and wherein the CSI-IM resources include a first pattern associated with a half-duplex mode and a second pattern associated with a full-duplex mode;
means for measuring at least one interference component of the CSI-IM resources in the downlink BWP, wherein the at least one interference component comprises interference associated with an intra-cell interfering uplink signal from an aggressor UE; and
means for transmitting a cross-link interference (CLI) report to the network, wherein the CLI report is based on the measurement of the of the at least one interference component.

28. A non-transitory computer-readable medium having computer executable code stored thereon that, when executed, causes an apparatus to:
receive, from a network, a configuration for one or more channel state information (CSI) interference measurement (IM) (CSI-IM) resources in a downlink bandwidth part (BWP) for measurement of inter-cell interference, wherein the CSI-IM resources span an uplink portion and a downlink portion of full-duplex resources in the downlink BWP, and wherein the CSI-IM resources include a first pattern associated with a half-duplex mode and a second pattern associated with a full-duplex mode;
measure at least one interference component of the CSI-IM resources in the downlink BWP, wherein the at least one interference component comprises interference associated with an intra-cell interfering uplink signal from an aggressor UE; and
transmit a cross-link interference (CLI) report to the network, wherein the CLI report is based on the measurement of the at least one interference component.

29. The method of claim 22, wherein the intra-cell interfering uplink signal comprises an interfering uplink reference signal from an aggressor UE, the intra-cell interfering uplink reference signal configured concurrent with the CSI-IM in time domain.

30. The method of claim 22, wherein the CSI-IM resources have a flexible frequency domain resource pattern in a downlink BWP of the UE, the flexible frequency domain resource pattern having a sparse allocation away from an uplink channel of the UE or an aggressor UE.

31. The UE of claim 1, wherein the configuration comprises information indicative of the at least one interference component of the CSI-IM resources in the downlink BWP.

32. The UE of claim 1, wherein the CSI-IM resources span a full downlink BWP.

33. The UE of claim 1, wherein the CSI-IM resources have different densities in the downlink portion and the uplink portion of the downlink BWP.

34. The UE of claim 33, wherein the CSI-IM resources have a higher density in the uplink portion of the downlink BWP than in the downlink portion of the BWP.

* * * * *